US012469607B2

(12) United States Patent
Wang et al.

(10) Patent No.: US 12,469,607 B2
(45) Date of Patent: Nov. 11, 2025

(54) METHOD FOR CONSTRUCTING PROGNOSTIC MODEL OF HEPATOMA AND APPLICATION THEREOF

(71) Applicant: WUHAN UNIVERSITY, Wuhan (CN)

(72) Inventors: Fubing Wang, Wuhan (CN); Fei Long, Wuhan (CN); Wei Zhong, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 19/035,563

(22) Filed: Jan. 23, 2025

(65) Prior Publication Data
US 2025/0299833 A1    Sep. 25, 2025

(30) Foreign Application Priority Data
Mar. 25, 2024    (CN) .......................... 202410345247.0

(51) Int. Cl.
G16H 50/50    (2018.01)
G16B 5/20     (2019.01)
(Continued)

(52) U.S. Cl.
CPC ............... *G16H 50/50* (2018.01); *G16B 5/20* (2019.02); *G16B 20/00* (2019.02); *G16B 40/20* (2019.02); *G16H 20/10* (2018.01); *G16H 50/20* (2018.01)

(58) Field of Classification Search
CPC ................................ G16H 50/50; G16H 50/20
See application file for complete search history.

(56) References Cited

U.S. PATENT DOCUMENTS 11,468,363 B2 *  10/2022  Neumann .............. G06N 20/00
2020/0126636 A1 *  4/2020  Yu .......................... G16H 50/30
(Continued)

FOREIGN PATENT DOCUMENTS

CN    115394445 A    11/2022
CN    115807089 A    3/2023
CN    116735874 A    9/2023

OTHER PUBLICATIONS

Title of the Item: naturecommunications Publication Date: Apr. 1, 2022 Name of the Author: Jingjing Qi et al. Article Title: Single-cell and spatial analysis reveal interaction of FAP+ fibroblasts and SPP1+ macrophages in colorectal cancer.

*Primary Examiner* — Jay M. Patel
(74) *Attorney, Agent, or Firm* — George D. Morgan

(57) ABSTRACT

The disclosure belongs to the field of genetic testing and biomedicine, relating to a method for constructing a prognostic model of hepatoma and an application thereof, comprising 1) obtaining and identifying fibroblasts with high FAP expression; 2) obtaining and identifying TAMs; 3) analyzing co-localization between fibroblasts with high FAP expression obtained and the TAMs obtained previously; 4) communicating and analyzing the fibroblasts with high FAP expression after the localization in the Step 3) with TAMs to obtain CCC ligand-receptor genes; 5) screening the CCC ligand-receptor genes obtained previously based on machine learning to obtain key CCC ligand-receptor genes; and 6) constructing a prognostic model of hepatoma according to the key CCC ligand-receptor genes obtained in the Step 5). The present disclosure provides a method for constructing a prognostic model of hepatoma that can be applied to auxiliary judgment of the prognosis of hepatoma patients and an application thereof.

6 Claims, 32 Drawing Sheets

(51) Int. Cl.
  *G16B 20/00* (2019.01)
  *G16B 40/20* (2019.01)
  *G16H 20/10* (2018.01)
  *G16H 50/20* (2018.01)

(56) References Cited

U.S. PATENT DOCUMENTS

2022/0059240 A1* 2/2022 Schaeffer ............... G16H 50/70
2024/0043934 A1  2/2024 Regev et al.

* cited by examiner

A

HCC1

HCC2

ICC

METHOD FOR CONSTRUCTING PROGNOSTIC MODEL OF HEPATOMA AND APPLICATION THEREOF

CROSS-REFERENCE TO RELATED APPLICATIONS

The application claims priority to Chinese patent application No. 2024103452470, filed on Mar. 25, 2024, the entire contents of which are incorporated herein by reference.

TECHNICAL FIELD

The present disclosure belongs to the field of genetic testing and biomedicine, relating to a method for constructing a prognostic model of hepatoma and an application thereof, in particular to a method for constructing a prognostic model of hepatoma based on cell-cell communicators between fibroblasts with high fibroblast activation protein alpha (FAP) expression and tumor-associated macrophages (TAMs) and an application thereof.

BACKGROUND

Liver cancer falls into two main categories: primary liver cancer and secondary liver cancer. Hepatocelluar carcinoma (HCC) is the most common primary liver cancer, followed by intrahepatic cholangiocarcinoma (ICC), accounting for more than 95% of the primary liver cancer cases, and some combined hepatocellular-cholangiocarcinoma (CHC) cases are included too. Currently, surgical resection, liver transplantation and local treatment (including radiofrequency ablation) are recommended as curative treatments for HCC. However, only one-third of patients may receive these curative treatments, and the remaining 60%-70% of patients receive non-curative treatments such as transarterial chemoembolization (TACE), with which, molecularly targeted agents (MTA), monoclonal antibodies or potential immune checkpoint inhibitors serve in an initial therapy. Recently, more and more data have emphasized the potential of immune checkpoint inhibitors in hepatoma treatment. Although anti-PD-1 monotherapy immune checkpoint inhibitors showed good efficacy in early trials, this finding was not confirmed in Phase III studies, and most patients did not respond to immunotherapy. Therefore, accurate prognostic assessment and appropriate treatment allocation are of great significance for the management of patients with hepatoma.

The application of new-generation sequencing technology has further deepened understanding of people on the hepatoma molecular map. Based on this, research teams around the world have developed a large number of prognostic prediction models to help physicians evaluate the prognosis of hepatoma patients and guide treatment decisions. However, the prior art, model efficiency and application potential are still limited. The reasons may include: (1) The sample size included in most studies is limited, and the sample heterogeneity of each cohort is large; (2) Conventional screening based on a prognostic model of hepatoma is usually based on an analysis of differential genes between hepatoma samples and normal samples, but the pathogenesis of hepatoma is complex, and simple differential gene screening may miss some key carcinogenic characteristic genes; (3) Most prognostic models are only based on the expression profile of tissue ribonucleic acid (RNA) sequencing to identify key genes for prognosis and construct models. Sequencing technologies such as single-cell and spatial transcriptome can be used to analyze the mechanism of hepatoma occurrence and development with a higher resolution, screen key pathogenic genes, and construct more efficient and interpretable prognostic models.

The tumor microenvironment is extremely important for the occurrence and development of tumors, especially the communication between different cells participates in the construction of complex pathogenic networks in the tumor microenvironment, which greatly affects the survival probability of patients and therapeutic effect. Furthermore, fibroblasts play a key role in cell-cell communication (CCC), and their strong signal transmission has been observed in a large number of studies, which is involved in forming a fiber barrier of immune rejection of tumors. Among them, TAMs have been widely reported to communicate and spatially colocalize with fibroblasts. The communication between these two kinds of cells plays an important role in supporting tumor growth and immune escape.

SUMMARY

In order to solve the above technical problems in the background art, the present disclosure provides a method for constructing a prognostic model of hepatoma and an application thereof that can be applied to auxiliary judgment of prognosis of hepatoma patients.

In order to achieve the above purpose, the following technical solution is adopted in the present disclosure:

a method for constructing a prognostic model of hepatoma, comprising the following steps:
1) obtaining and identifying fibroblasts with high FAP expression;
2) obtaining and identifying TAMs;
3) co-localizing the fibroblasts with high FAP expression obtained in the Step 1) and the TAMs obtained in the Step 2);
4) communicating and analyzing the fibroblasts with high FAP expression after the localization in the Step 3) with TAMs to obtain CCC ligand-receptor genes;
5) screening the CCC ligand-receptor genes obtained in the Step 4) based on machine learning to obtain key CCC ligand-receptor genes; and
6) constructing a prognostic model of hepatoma according to the key CCC ligand-receptor genes obtained in the Step 5).

Preferably, the specific implementation manner of the Step 1) adopted in the present disclosure is as follows:
1.1) performing a subgroup classification of hepatoma single-cell data in a collected and integrated discovery cohort using R package seurat to extract fibroblast subgroups with high COL1A1 expression;
1.2) further subdividing the fibroblast subgroups with high COL1A1 expression obtained in the Step 1.1) to identify fibroblasts with high FAP expression; and
1.3) identifying an infiltration degree of fibroblasts with high FAP expression in cancer samples and the expression of FAP by single-cell verification of hepatoma, RNA sequencing of hepatoma tissues by The Cancer Genome Atlas (TCGA) and immunohistochemical pathological section validation provided by The Human Protein Atlas (THPA) database.

Preferably, the specific implementation manner of the Step 2) adopted in the present disclosure is as follows:
2.1) performing a subgroup classification of hepatoma single-cell data in a collected and integrated discovery cohort using R package seurat to extract macrophage subgroups with high CD68 expression;

2.2) further subdividing the extracted macrophage subgroups with high CD68 expression;

2.3) performing an OR analysis to assess the enrichment preference of different cell types in different samples and screening for cell types highly enriched in hepatoma samples;

2.4) reconstructing a macrophage differentiation process using an RNA rate analysis in another collected and integrated single-cell validation cohort, and identifying the type of macrophages that terminally differentiate with tumor development as TAMs; the macrophage type being high Disabled-2 (DAB2) expression or high Secreted Phosphoprotein 1 (SPP1) expression; and 2.5) scoring the polarization of classically activated macrophages (M1) and alternatively activated macrophages (M2) by an UCELL analysis to verify the type of TAM polarization.

Preferably, the specific implementation manner of the Step 3) adopted in the present disclosure is as follows: mapping the identified single-cell subgroup to spatial transcriptome sequencing sections using R package CellTrek, and confirming that fibroblasts with high FAP expression have a high spatial proximity to TAMs by Kullback-Leibler divergence.

Preferably, the specific implementation manner of the Step 4) adopted in the present disclosure is as follows:

4.1) identifying the CCC ligand-receptors between TAMs and fibroblasts with high FAP expression using R package NicheNet, and identifying the target genes of fibroblasts with high FAP expression affected by TAMs;

4.2) analyzing the function of target genes by g:Profiler to understand the main functional regulation of TAMs on fibroblasts with high FAP expression;

4.3) scoring a tissue sequencing sample based on the activity of CCC ligand-receptors using the ssGSEA algorithm, and the scoring result being LRscore;

4.4) identifying a cutoff value of optimal survival probability grouping of samples by R package survminer, and testing the predictive effect of LRscore on an overall survival probability of patients by Kaplan-Meier curves, wherein if log-rank p<0.05, the test standards are satisfied;

4.5) on the basis of the Step 4.4), testing the predictive effect of LRscore on immunotherapy response in patients with hepatoma by box plots, wherein if wilcox.testp<0.05, the test standards are satisfied; and 4.6) obtaining CCC ligand-receptor genes based on the result of the Step 4.5).

Preferably, the specific implementation manner of the Step 5) adopted in the present disclosure is as follows:

5.1) in the TCGA HCC cohort, genes with log-rank p<0.05 being further screened from those constructed for LRscoring using univariate Cox analysis; and 5.2) using such machine learning algorithms as Stepcox, RSF, LASSO and CoxBoost to determine key genes from the genes screened in the Step 5.1), respectively, and defining an intersection of key genes to obtain final modeling genes.

Preferably, the specific implementation manner of the Step 6) adopted in the present disclosure is as follows:

6.1) based on the modeling genes determined in the Step 5.2), constructing a multivariate Cox model in the TCGA and GEO hepatoma cohorts, calculating model scores, and the model score being calculated according to the following equation:

Coxmodel score=$\Sigma_i$Expression (mRNA)$_i$*Coefficient (mRNA)$_i$ where i is the key gene screened;

6.2) using KM curves to evaluate the survival prediction performance of the model constructed in the Step 6.1);

6.3) predicting patients' response to immunotherapy based on Coxmodel score; and 6.4) constructing a prognostic model of hepatoma based on the results in the Step 6.3).

A prognostic model of hepatoma obtained by the above-mentioned method for constructing a prognostic model of hepatoma.

An application of the above-mentioned prognostic model of hepatoma in auxiliary judgment of disease prognosis.

An application of the above-mentioned prognostic model of hepatoma in auxiliary judgment of hepatoma prognosis.

The beneficial effects of the present disclosure are as follows:

The present disclosure provides a method for constructing a prognostic model of hepatoma, and the method comprises 1) obtaining and identifying fibroblasts with high FAP expression; 2) obtaining and identifying TAMs; 3) analyzing co-localization between the fibroblasts with high FAP expression obtained in the Step 1) and the TAMs obtained in the Step 2); 4) communicating and analyzing the fibroblasts with high FAP expression after the localization in the Step 3) with TAMs to obtain CCC ligand-receptor genes; 5) screening the CCC ligand-receptor genes obtained in the Step 4) based on machine learning to obtain key CCC ligand-receptor genes; and 6) constructing a prognostic model of hepatoma according to the key CCC ligand-receptor genes obtained in the Step 5). The present disclosure identifies the key cell types that promote cancer development in hepatoma patients, clarifies the key role of intercellular interactions in promoting hepatoma development, and finally constructs a prognostic prediction model of hepatoma based on CCC ligand-receptor genes; the model can accurately predict the risk of patients' hepatoma development based on transcriptome data of hepatoma. Moreover, the quantified model scores can be used to assess the response of hepatoma patients to immunotherapy and provide treatment guidance for patients. In conclusion, the present disclosure can provide clinicians with more accurate prognostic assessment and treatment guidance, thereby improving therapeutic efficacy and survival rate of hepatoma patients. The present disclosure finds that fibroblasts with high FAP expression are markedly infiltrated in all types of hepatoma. FAP, or fibroblast-activating protein, involves in the procarcinogenic activation of fibroblasts in the tumor environment. Therefore, it is of great potential to develop a risk prediction model based on CCC ligand-receptors between fibroblasts with high FAP expression and TAMs to accurately predict patient survival outcomes and effectively evaluate the immunotherapy efficacy. The present disclosure provides a method for identifying key ligand-receptor genes based on cell-cell communication and constructing a prognostic model. A Cox prognostic model is established to distinguish high-risk patients from low-risk patients, and the response of patients to immunotherapy is assessed based on quantitative model scores, which can be applied in auxiliary judgment of hepatoma prognosis.

DETAILED DESCRIPTION OF THE EMBODIMENTS

Figure 1:
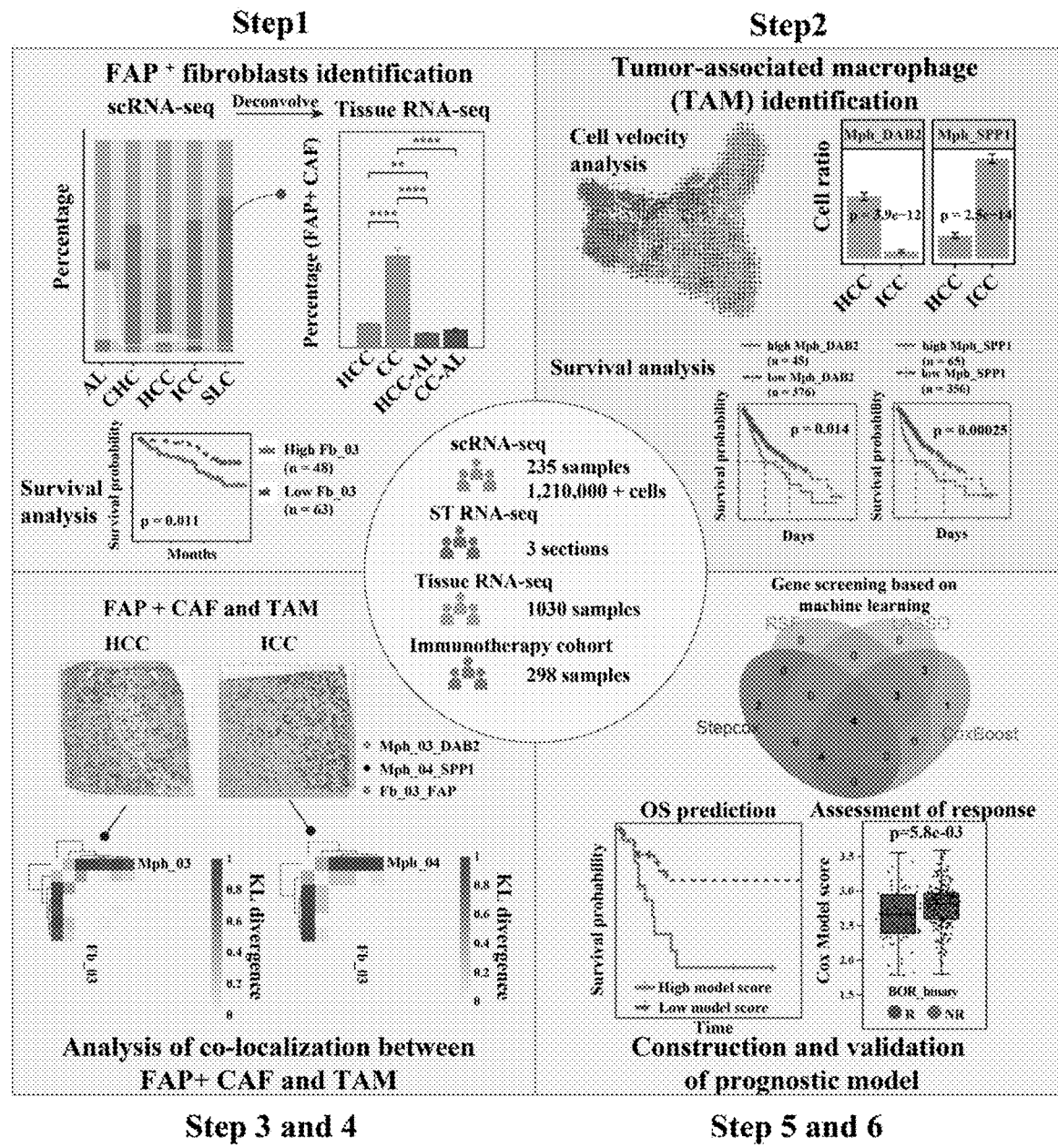
FIG. 1 is a flow chart of the method for constructing a prognostic model of hepatoma provided by the present disclosure and an overview of its implementation effect.
Figure 2A:
FIG. 2A-FIG. 2G are identification and validation effect diagrams of fibroblasts with high FAP expression used in the present disclosure.
Figure 2B:
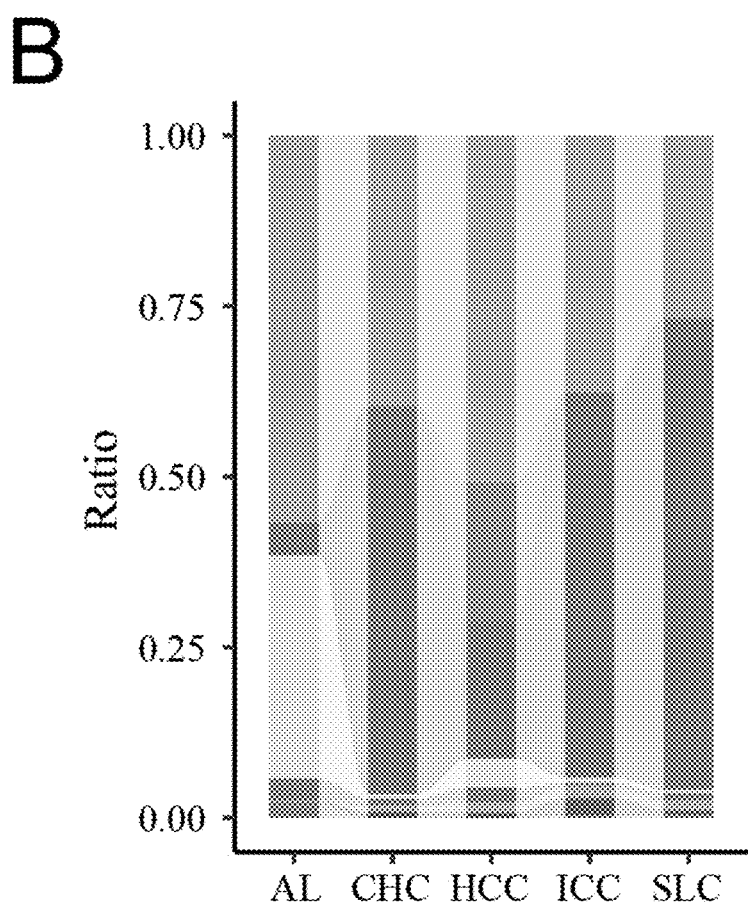
Figure 2C:
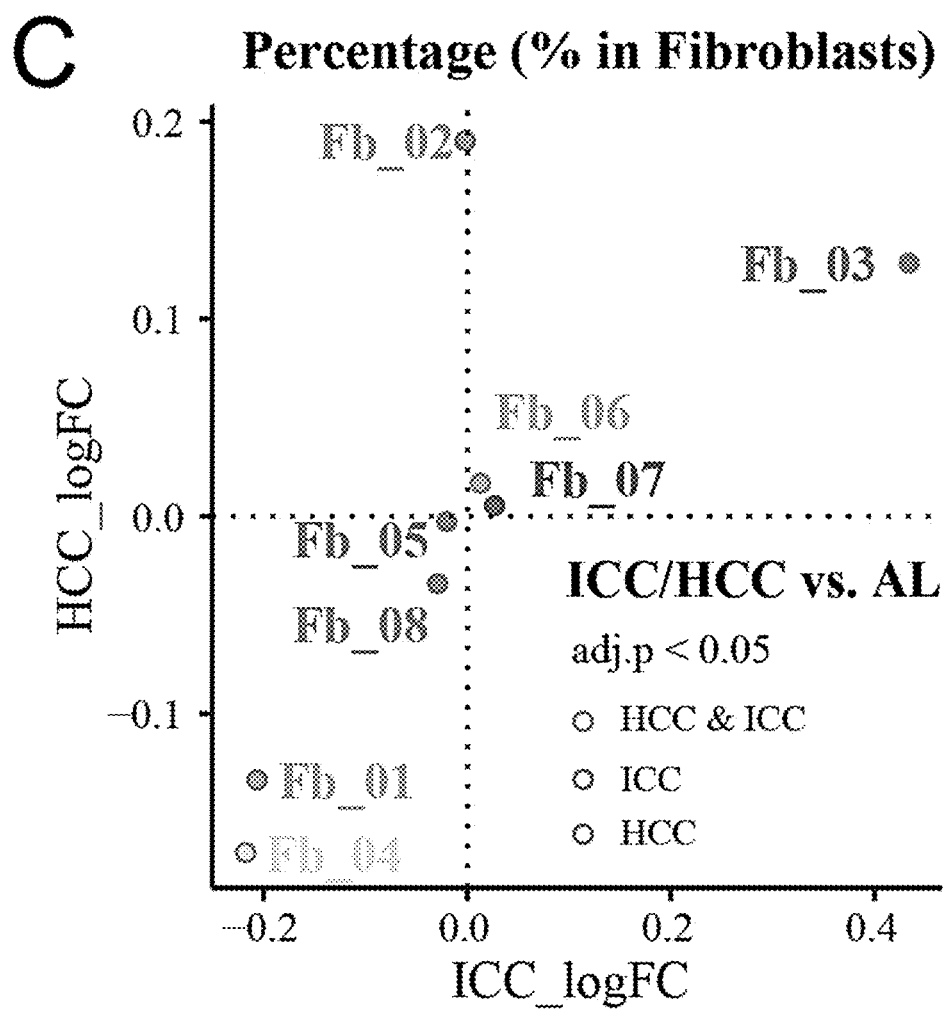
Figure 2D:
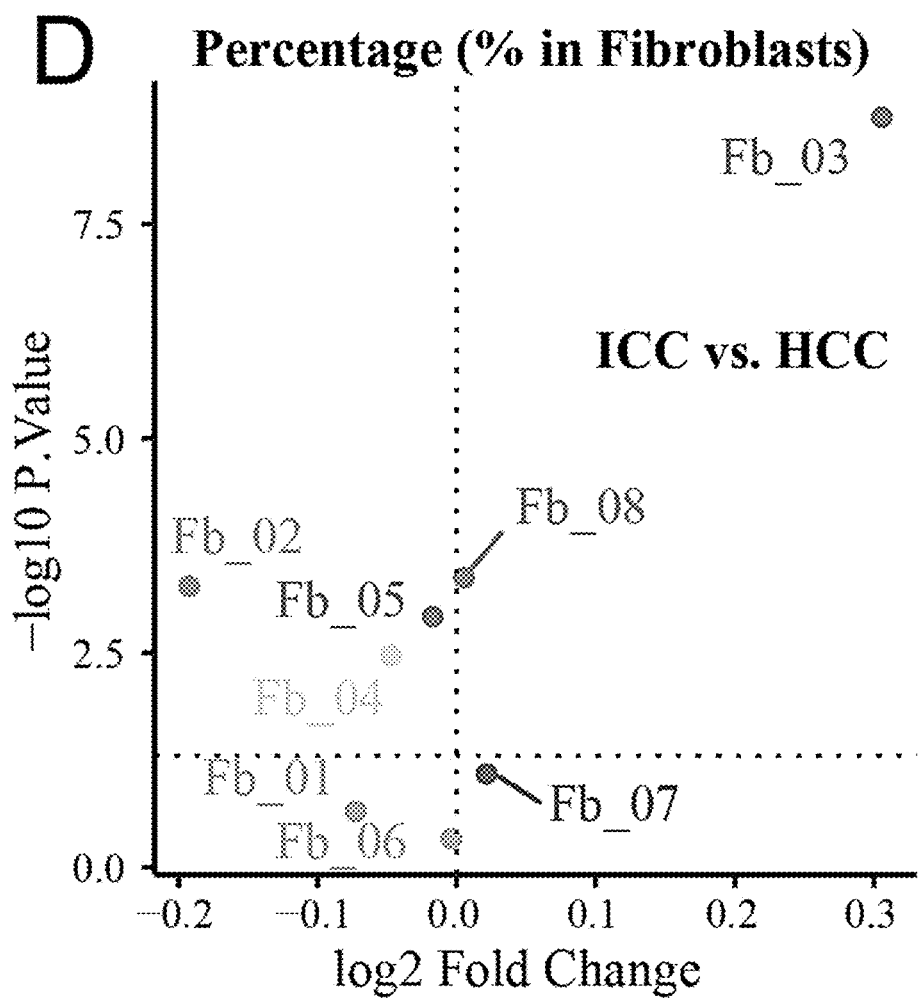
Figure 2E:
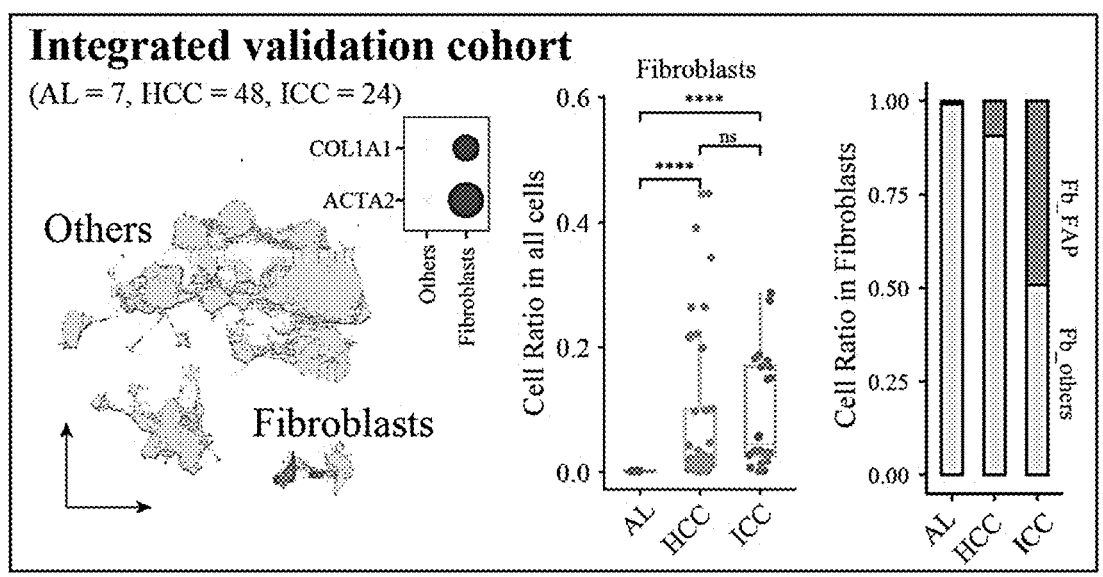
Figure 2F:
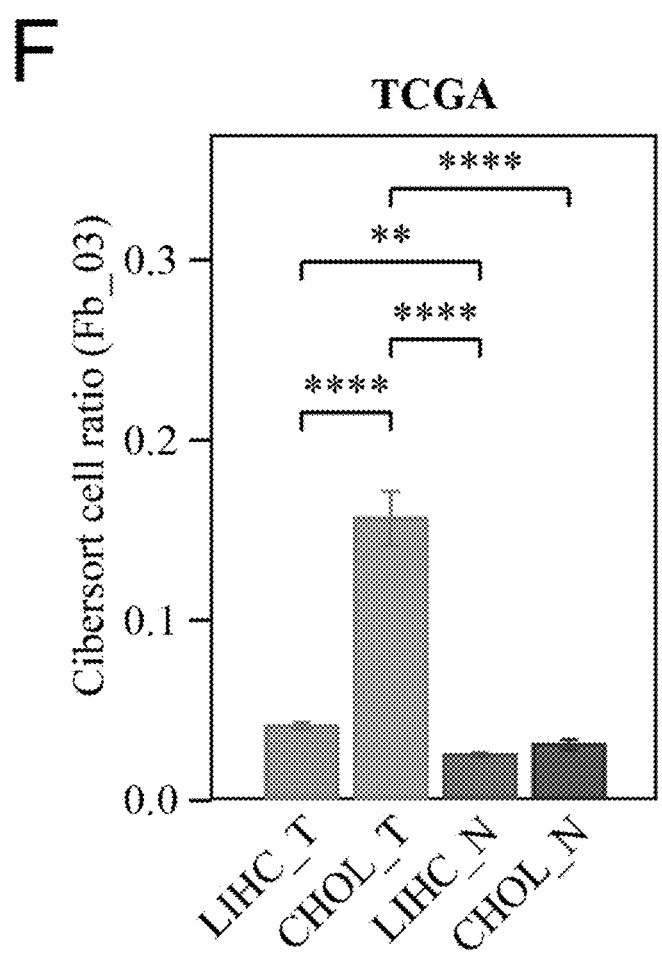
Figure 2G:
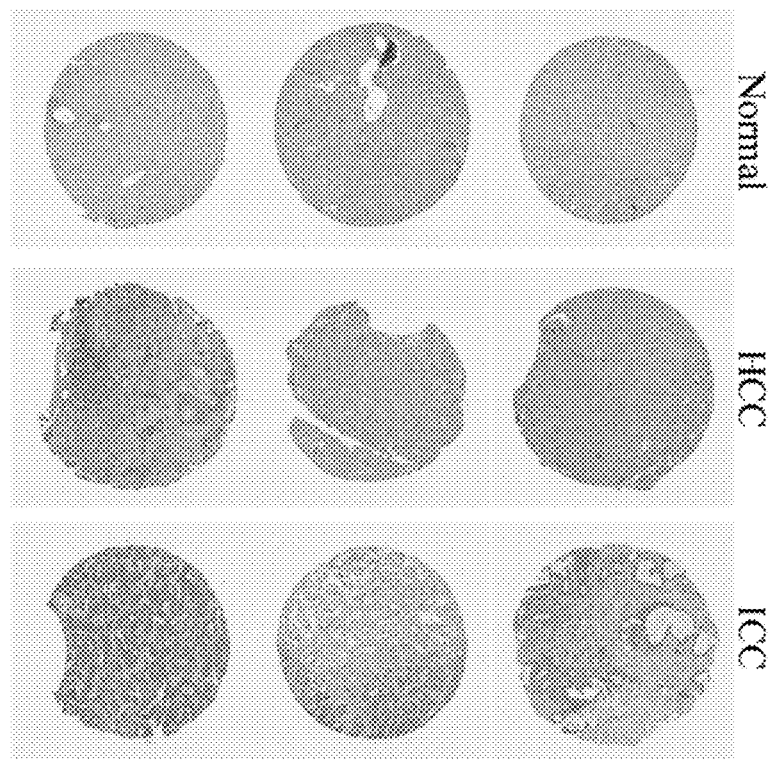

As shown in FIG. 1, the present disclosure provides a method for constructing a prognostic model of hepatoma, mainly comprising the following steps:

Step 1: identifying fibroblasts with high FAP (Fibroblast Activation Protein Alpha) expression and performing a prognostic correlation analysis (in the field of single-cell analysis, fibroblasts are grouped by umap subgroup clustering, where the group with highest FAP expression is defined as fibroblasts with high FAP expression), specifically as follows:

performing a subgroup classification of hepatoma single-cell data collected and integrated from a discovery cohort with 146 samples, including 14 adjacent lesion (AL) cases, 82 hepatocellular carcinoma (HCC) cases, 31 intrahepatic cholangiocarcinoma (ICC) cases, 9 combined hepatocellular-cholangiocarcinoma (CHC) cases and 10 secondary liver cancer (SLC) cases, totaling approximately 1.2 million cells, extracting about 50,000 fibroblasts with high COL1A1 expression, and then further subdividing the extracted fibroblasts into subgroups to identify fibroblasts with high FAP expression, as shown in FIG. 2A, wherein part A is an umap cluster graph illustrating a fibroblast subtype in the discovery cohort. The infiltration of fibroblasts with high FAP expression is significantly high in various hepatoma samples, compared with that in AL, as shown in FIG. 2B, which shows the distribution proportion of different types of fibroblasts in different sample types. In the comparison of the two major types of hepatoma, the infiltration of fibroblasts with high FAP expression in ICC samples is significantly higher than that in HCC samples, as shown in FIG. 2C, which shows the distribution of fold change in the proportion of cells in HCC vs. AL samples and that in ICC samples. The red dots represent cells that have a significant ratio change in HCC and ICC samples compared to AL samples. The blue dots represent cells that have a significant ratio change only in ICC samples compared to AL samples. The green dots represent cells that have a significant ratio change only in HCC sample compared to AL samples. A validation cohort of 79 samples for hepatoma single-cell integration, 469 TCGA hepatoma tissue RNA sequencing samples and 9 immunohistochemical pathological sections provided by the THPA database are used to validate the infiltration degree of fibroblasts with high FAP expression in cancer samples and the increased expression of FAP, as shown in FIG. 2E-FIG. 2G, wherein the left umap diagram in FIG. 2E shows that fibroblasts are extracted from cells in the single-cell validation cohort, the scattered box plot in the middle shows a significantly increased infiltration ratio of fibroblasts in cancer samples. The stacked bar graph on the right shows an increased infiltration ratio of fibroblasts with high FAP expression in cancer samples. FIG. 2F shows, in a tissue-based assessment of cell proportion, an increased infiltration ratio of fibroblasts with high FAP expression in cancer samples. FIG. 2G shows, with immunohistochemical staining of pathological sections, an enhanced FAP expression in cancer samples. Cellular infiltration assessment based on TCGA samples is performed using CIBERSORTx. Subsequently, univariate Cox analysis and KM curves are used to verify that the high infiltration of fibroblasts with high FAP expression is associated with a poorer overall survival probability of patients.

Figure 3A:
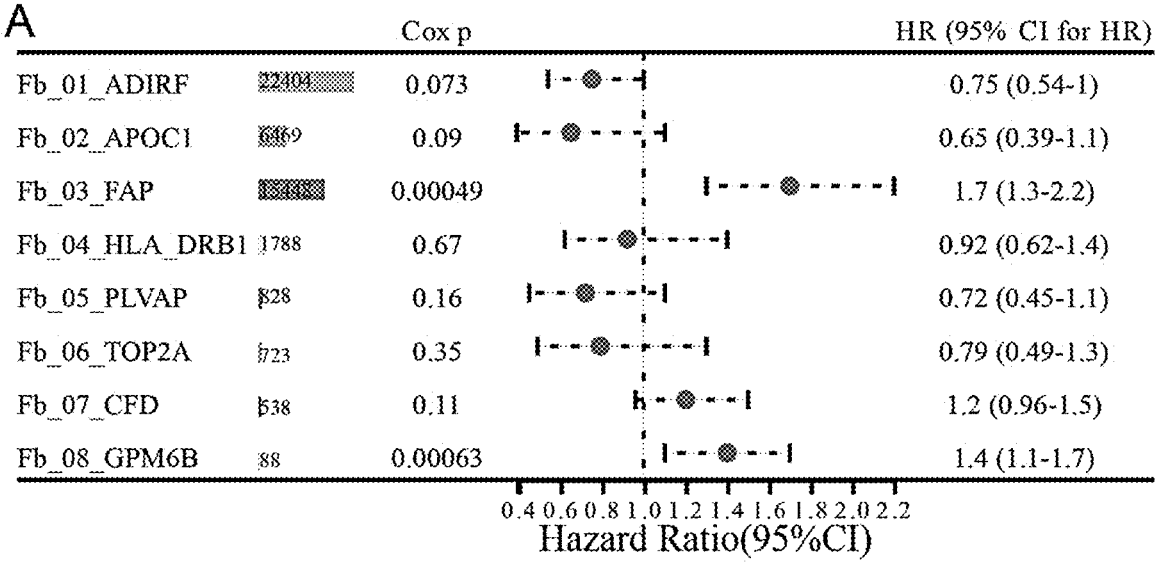
FIG. 3A-FIG. 3C are diagrams of analysis illustrating correlation between fibroblasts with high FAP expression used in the present disclosure and clinical characteristics.
Figure 3B:
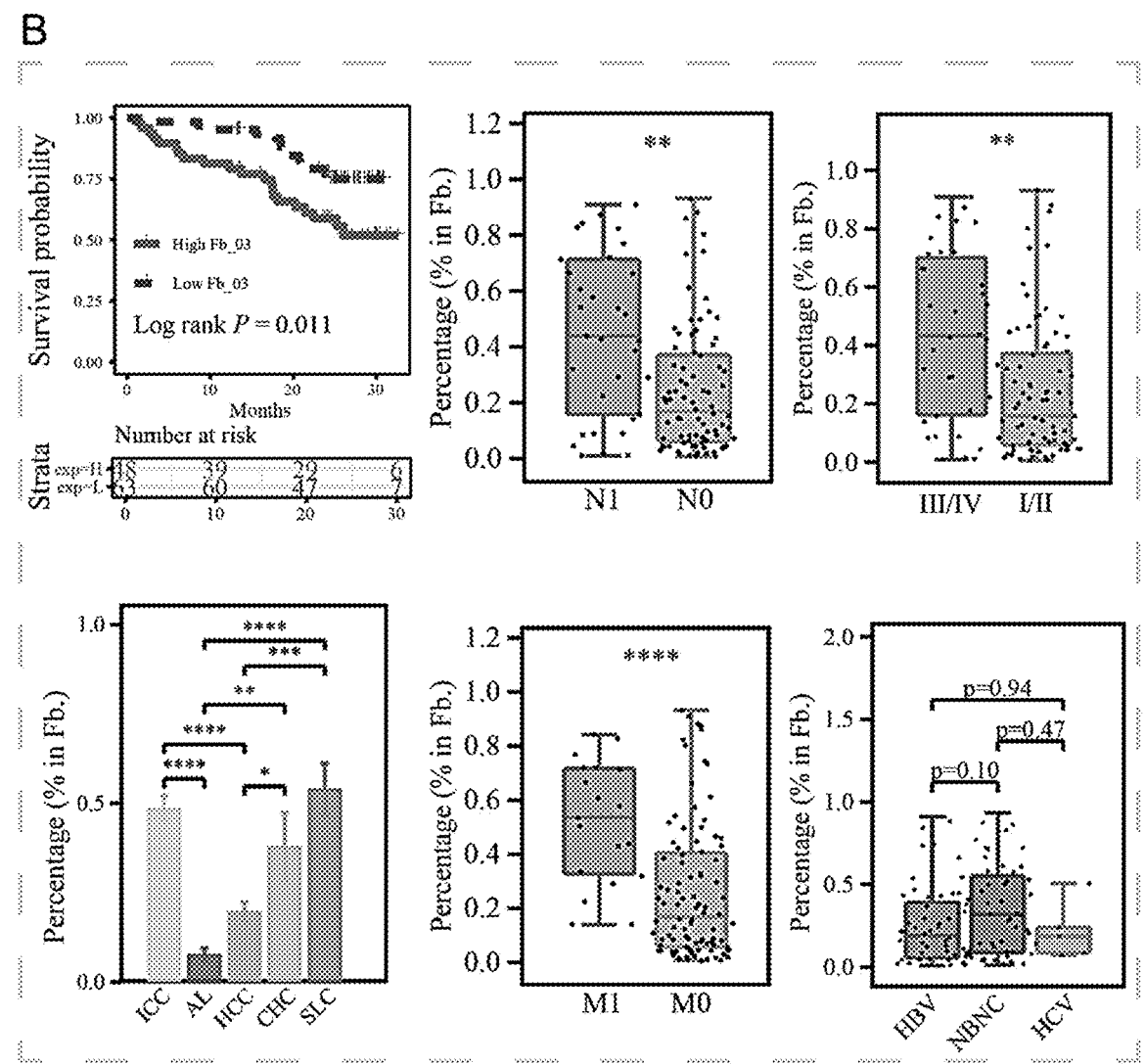
Figure 3C:
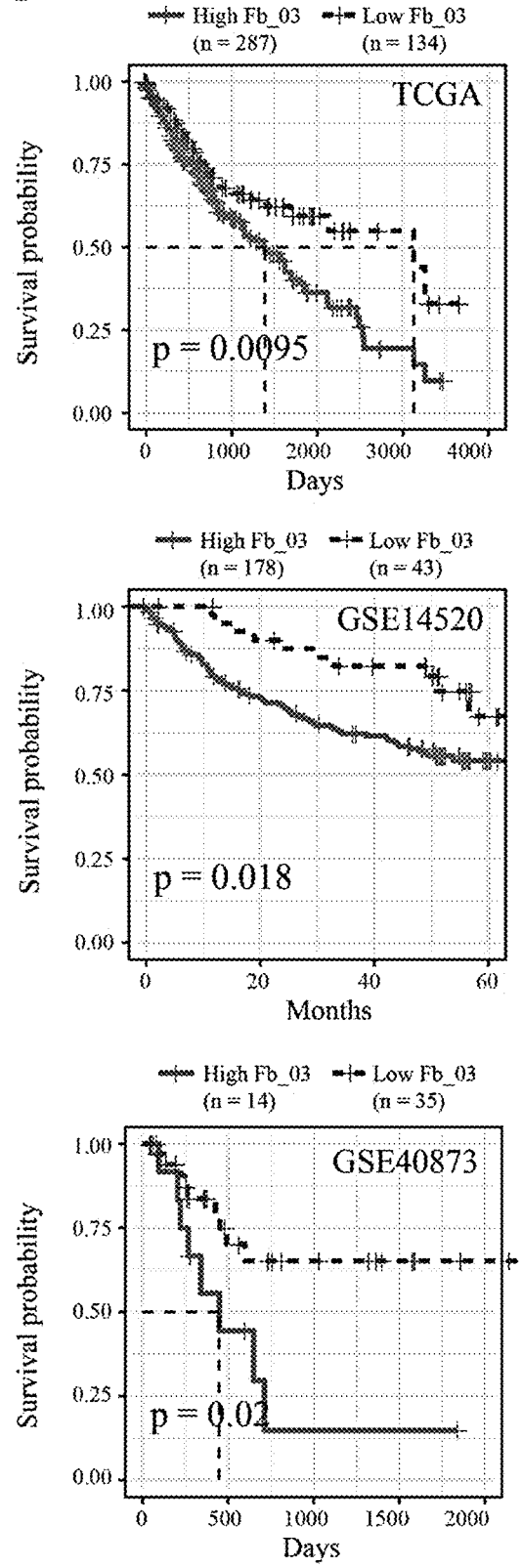

As shown in FIG. 3 (in FIG. 3A, a forest plot is used to show the correlation between different fibroblast ratios and survival risks of patients; in FIG. 3B, KM curves, box plots and bar graphs are used to show the correlation between ratios of fibroblasts with high FAP expression and the overall survival probability, staging, lymph node metastasis, distant metastasis, viral infection and sample distribution in hepatoma patients; in FIG. 3C, KM curves are used to show the correlation between infiltration of fibroblasts with high FAP expression and the overall survival probability of hepatoma patients in three independent cohorts), the infiltration of fibroblasts with high FAP expression has the highest risk rate and is correlated with a poorer overall survival probability, higher tumor staging, lymph node metastases and distant metastases of patients in the single-cell cohort, but not significantly correlated with viral infection. In the additional 3 tissue RNA sequencing cohorts, a high infiltration of fibroblasts with high FAP expression also predicts a poorer overall survival probability of HCC patients. This indicates a successful identification of fibroblasts with high FAP expression in hepatoma patients.

Figure 4A:
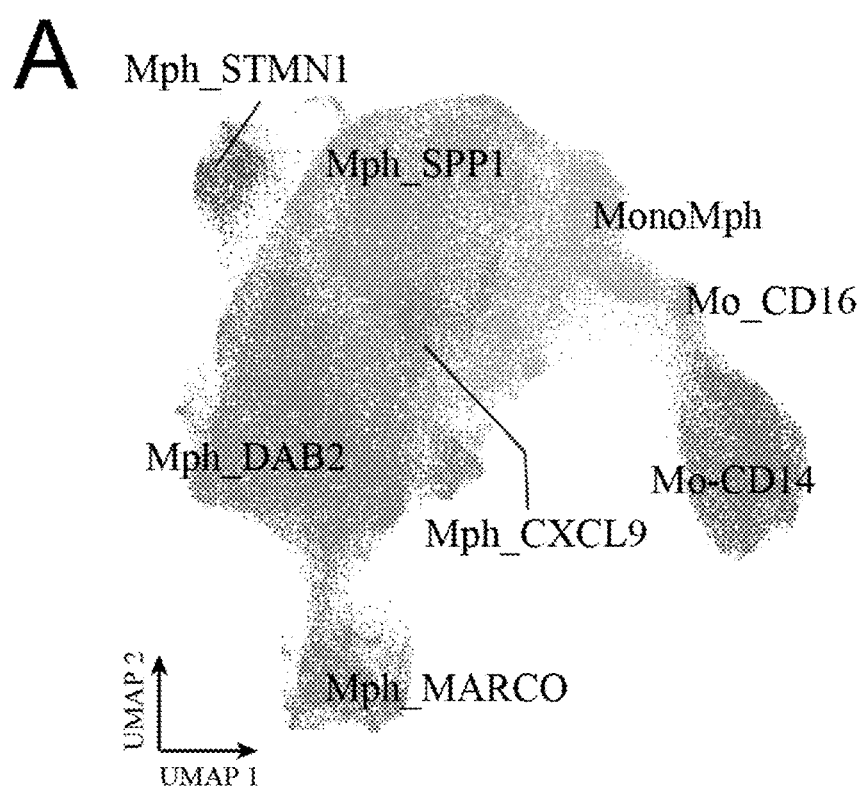
FIG. 4A-FIG. 4G are diagrams of TAM identification and survival correlation analysis used in the present disclosure.
Figure 4B:
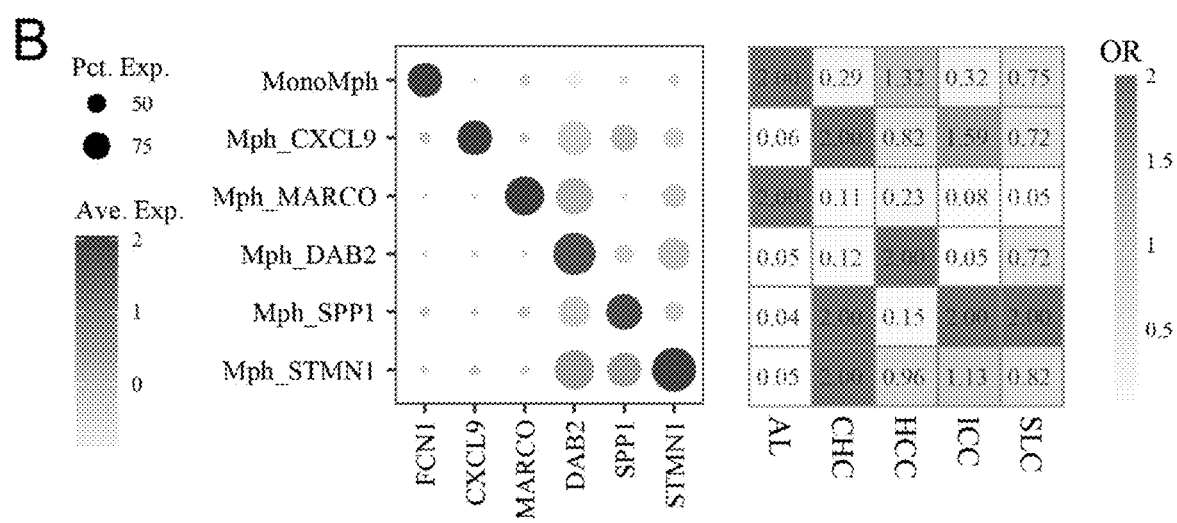
Figure 4C:
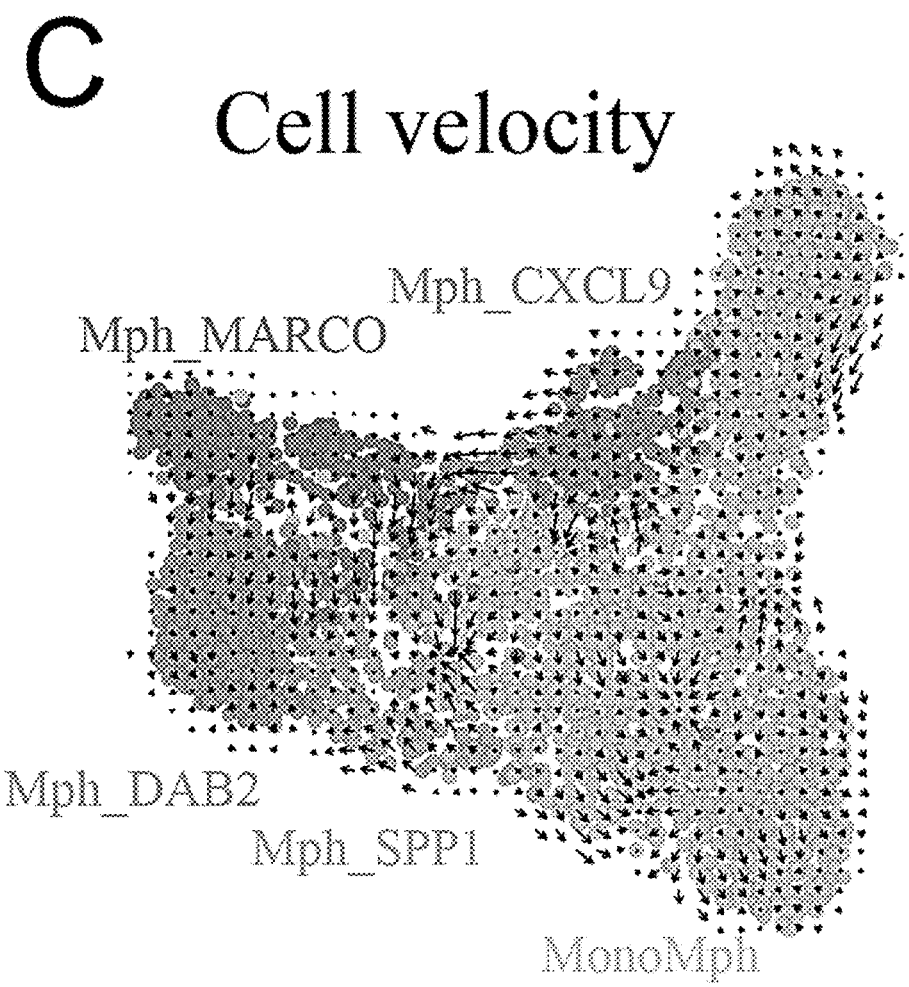

Step 2: identifying TAMs and performing a prognostic correlation analysis, specifically as follows:

performing a subgroup classification of hepatoma single-cell data in the above-mentioned discovery cohort using R package seurat to extract 150,000 macrophages with high CD68 expression, and further subdividing the extracted macrophages (in FIG. 4A, this is an umap cluster graph of macrophages in the discovery cohort). An OR analysis is performed to assess the enrichment preference of different cell types in different samples, among which DAB2 macrophages are specifically enriched in HCC samples and SPP1 macrophages are enriched in other hepatoma types (as shown in FIG. 4B, the left figure shows the specific gene expression map of different macrophage subgroups, and the right figure shows the enrichment preference heatmap of different macrophage subgroups in different sample types. The higher the OR value, the higher the degree of cell population enrichment in this sample type). The macrophage differentiation process is reconstructed using RNA rate analysis in the single-cell validation cohort of the Step 1), and the type of macrophages that terminally differentiate with tumor development (high DAB2 expression or high SPP1 expression) are identified as TAMs (in FIG. 4C, RNA rate plots show potential differentiation directions of different cell subgroups).

Figure 4D:
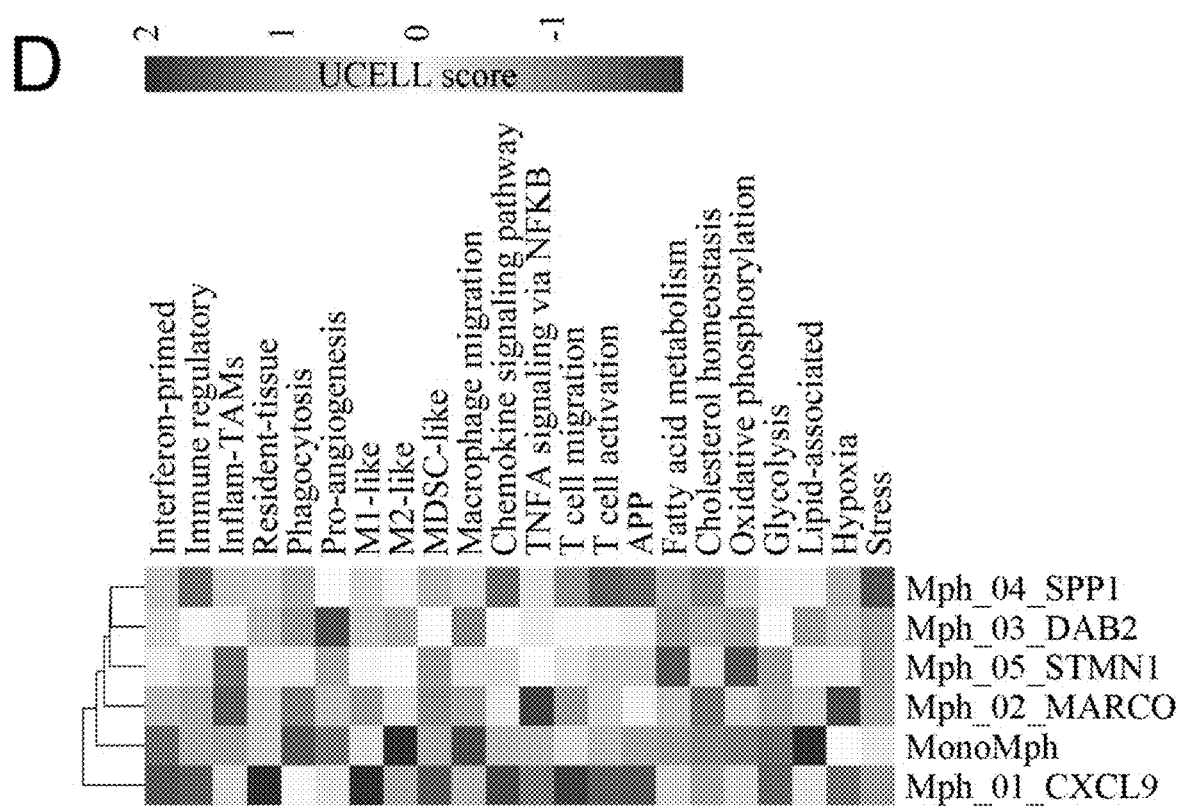
Figure 4E:
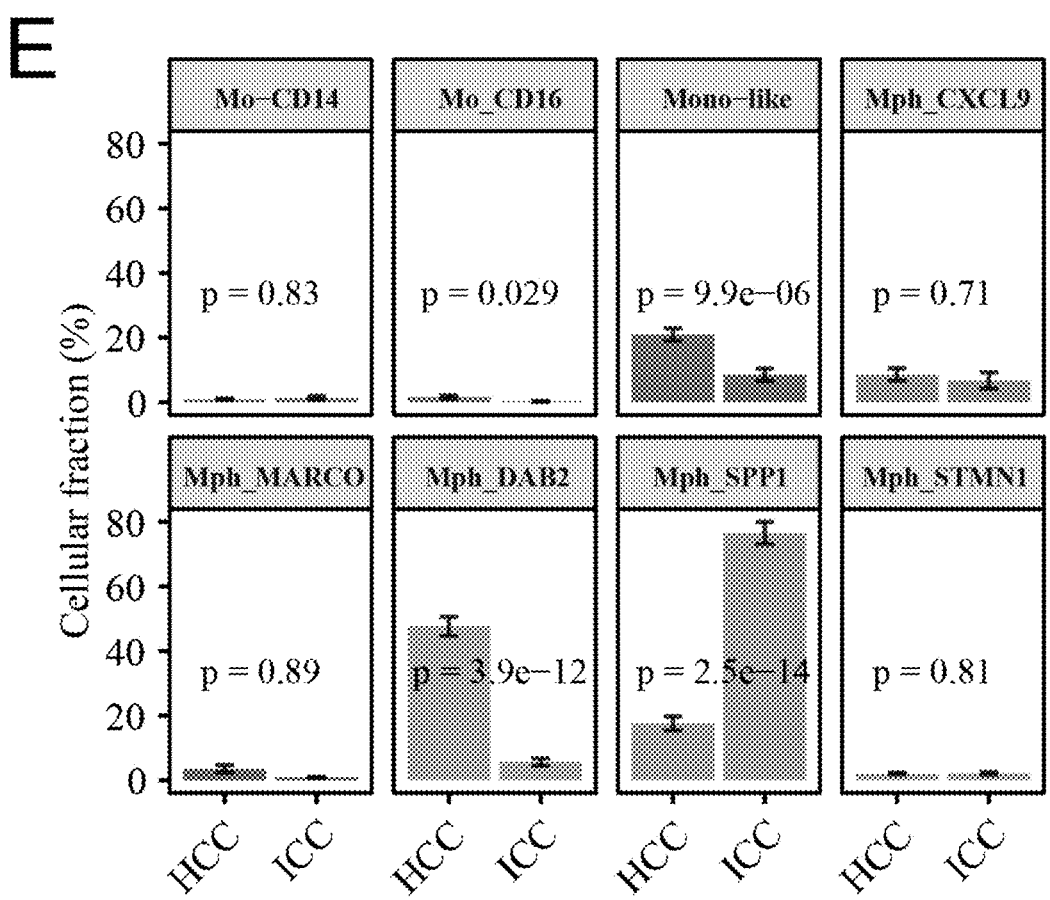
Figure 4F:
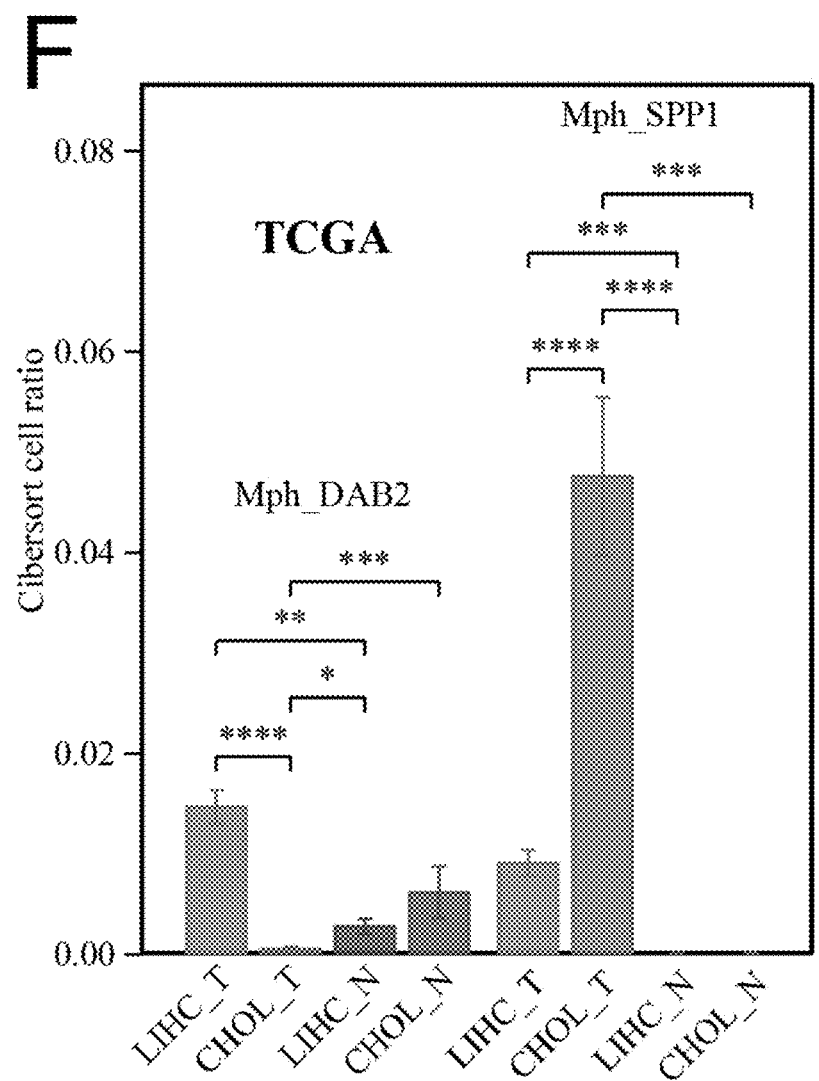
Figure 4G:
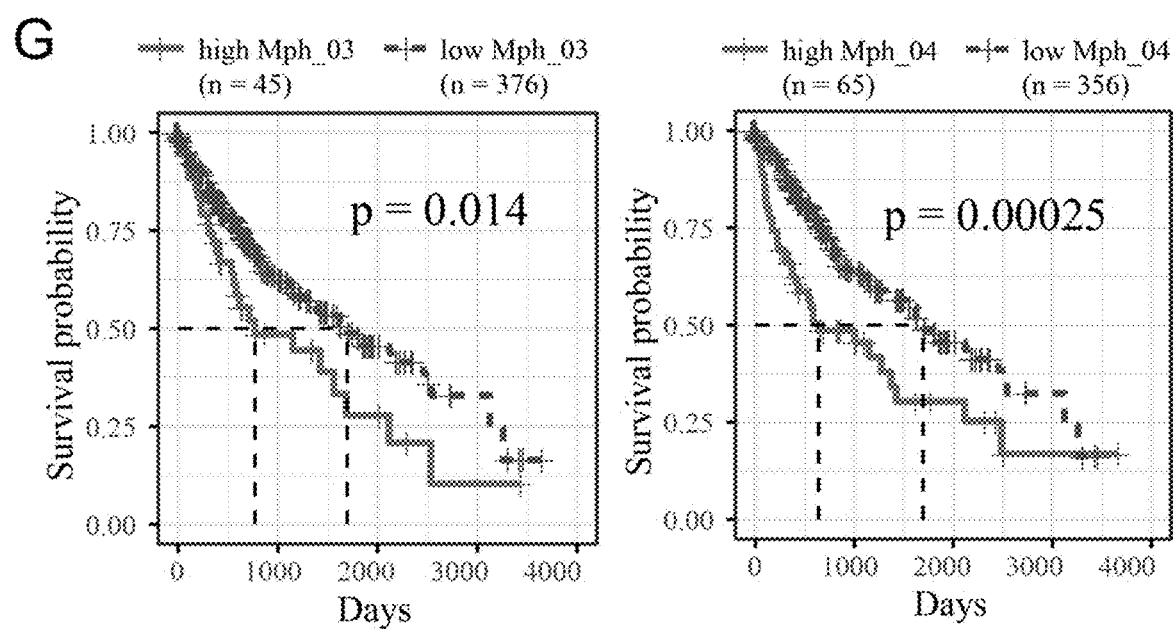

The polarization of classically activated macrophages (M1) and alternatively activated macrophages (M2) is scored by an UCELL analysis, and both macrophages with high DAB2 expression and high SPP1 expression have higher M2 polarization scores, suggestive of their TAM characteristics (FIG. 4D shows the enrichment scores of macrophage-related functions for different macrophage subgroups with a heatmap). In a comparison of two major hepatoma types, the infiltration of macrophages with high SPP1 expression in ICC samples is higher than that in HCC samples, while the infiltration of macrophages with high DAB2 expression in HCC samples is higher than that in ICC samples (in FIG. 4E and FIG. 4F, FIG. 4E is a bar graph comparing the ratios of infiltration by different macrophage subgroups in HCC and ICC samples, and FIG. 4F is a bar graph showing macrophages with high DAB2 and SPP1 expression are enriched in HCC and ICC samples, respectively.). At the end, KM curves are used to assess the correlation between TAMs and survival probability of patients. High infiltration scores of both types of TAMs suggest a poorer overall survival probability of hepatoma patients (in FIG. 4G, KM curves are used to show that high infiltration scores of macrophages with high DAB2 and SPP1 expression are correlated with a poorer overall survival probability of hepatoma patients).

Figure 5A:
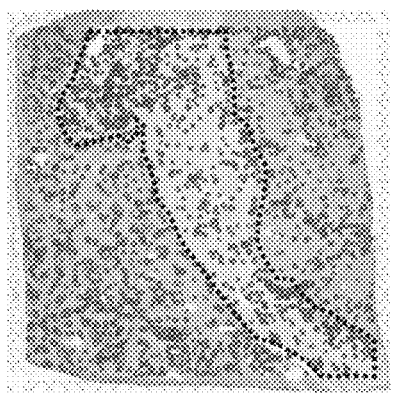
FIG. 5A-FIG. 5B are diagrams of analysis illustrating co-localization between fibroblasts with high FAP expression and macrophages used in the present disclosure.
Figure 5A:
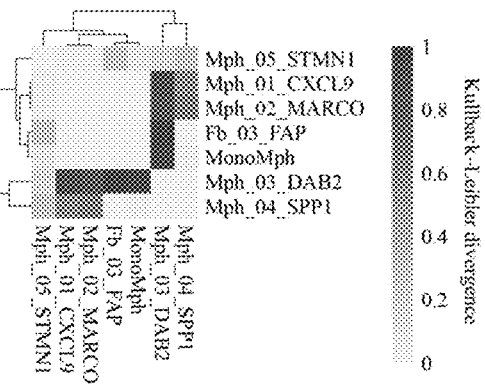
Figure 5A:
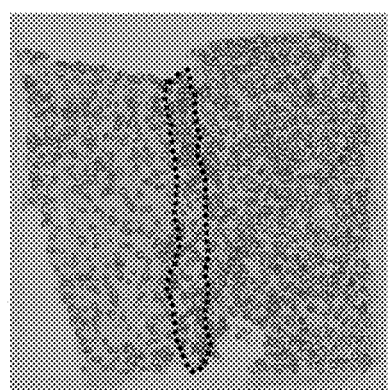
Figure 5A:
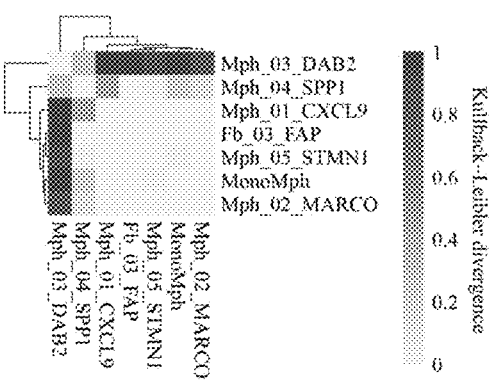
Figure 5A:
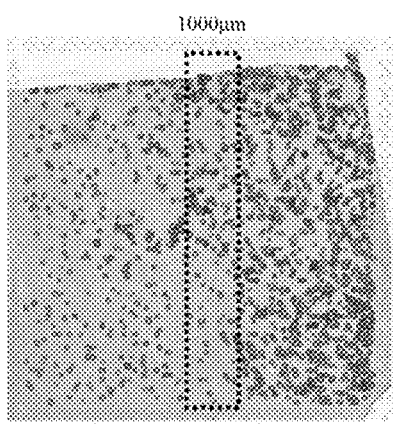
Figure 5A:
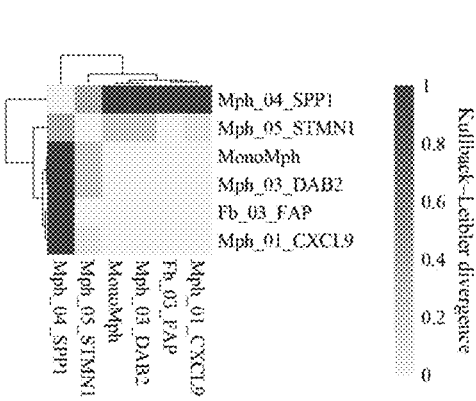
Figure 5B:
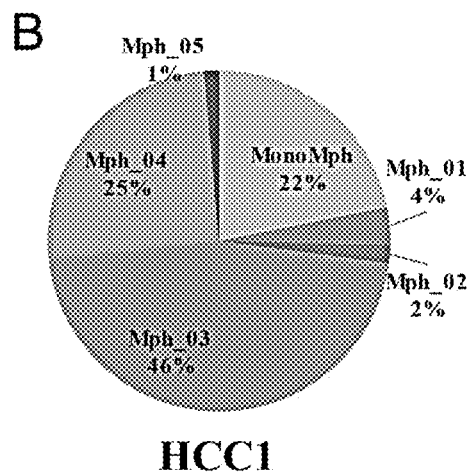
Figure 5B:
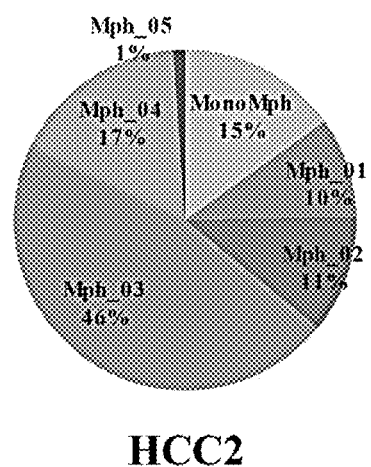
Figure 5B:
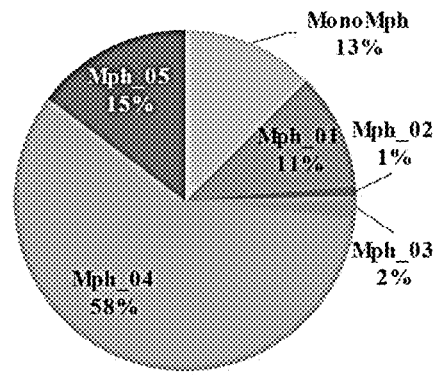

Step 3: analyzing co-localization between the fibroblasts with high FAP expression and the TAMs, specifically as follows:

mapping the identified single-cell subgroup to spatial transcriptome sequencing sections using R package CellTrek (the left in FIG. 5A shows the spatial mapping of single-cell subgroups on hepatoma sections), and evaluating the spatial proximity between fibroblasts with high FAP expression and the TAMs by Kullback-Leibler divergence, wherein in HCC samples, fibroblasts with high FAP expression and macrophages with high DAB2 expression have high spatial co-localization characteristics, in ICC samples, fibroblasts with high FAP expression and macrophages with high SPP1 expression have high spatial localization characteristics (the right in FIG. 5A shows KL divergence between different cell subgroups, with high KL divergence suggesting a high probability of spatial co-localization). By evaluating ratios of macrophages, it is further found that TAMs with high DAB2 expression and high SPP1 expression are highly enriched on HCC and ICC sections, respectively (in FIG. 5B, a sector plot is used to show the infiltration ratio of different macrophage subtypes on space sections).

Figure 6A:
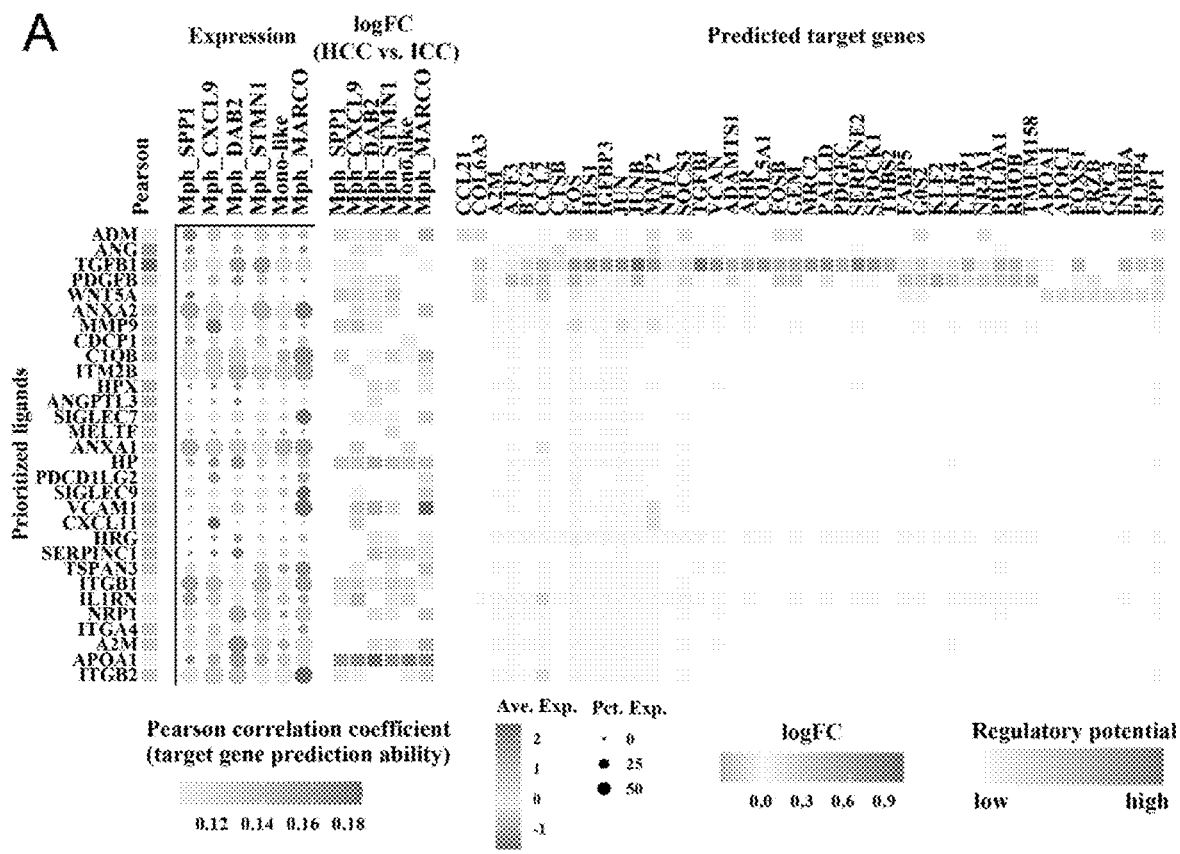
FIG. 6A-FIG. 6G are diagrams of cell communication analysis and communication score evaluation used in the present disclosure.
Figure 6B:
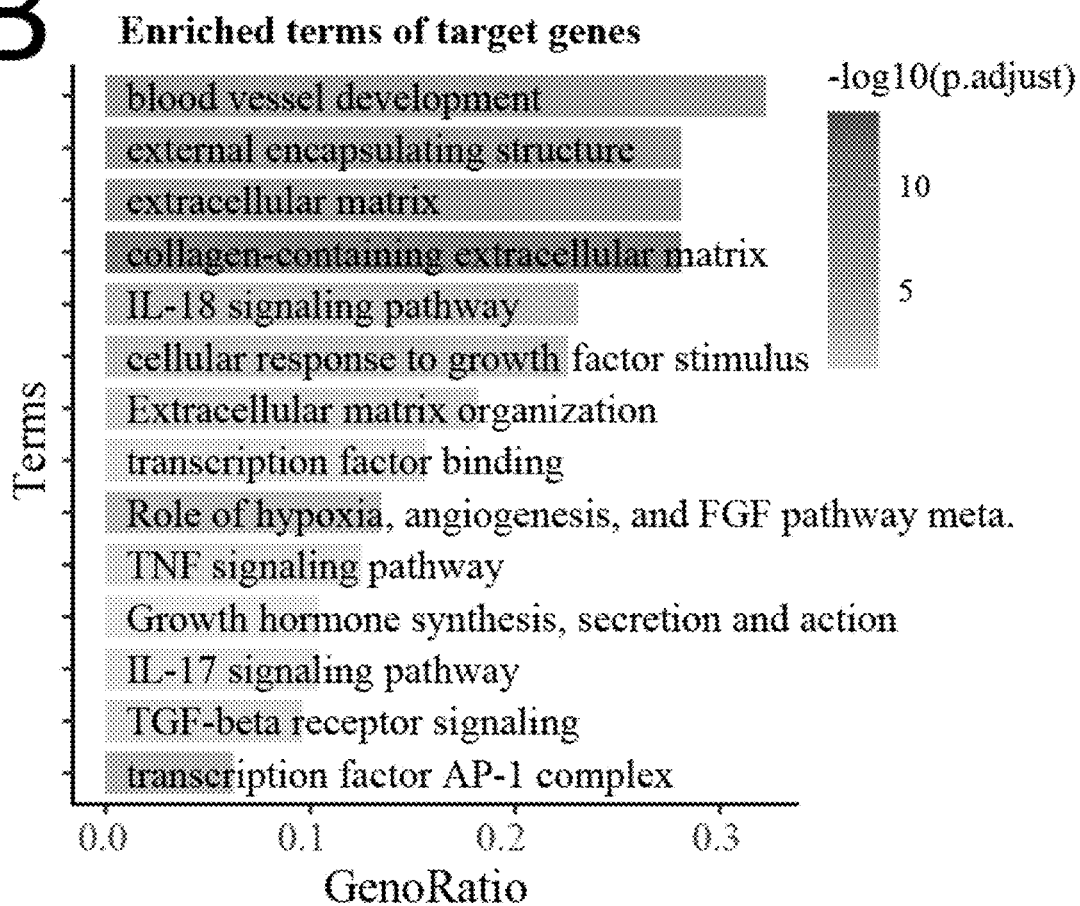
Figure 6C:
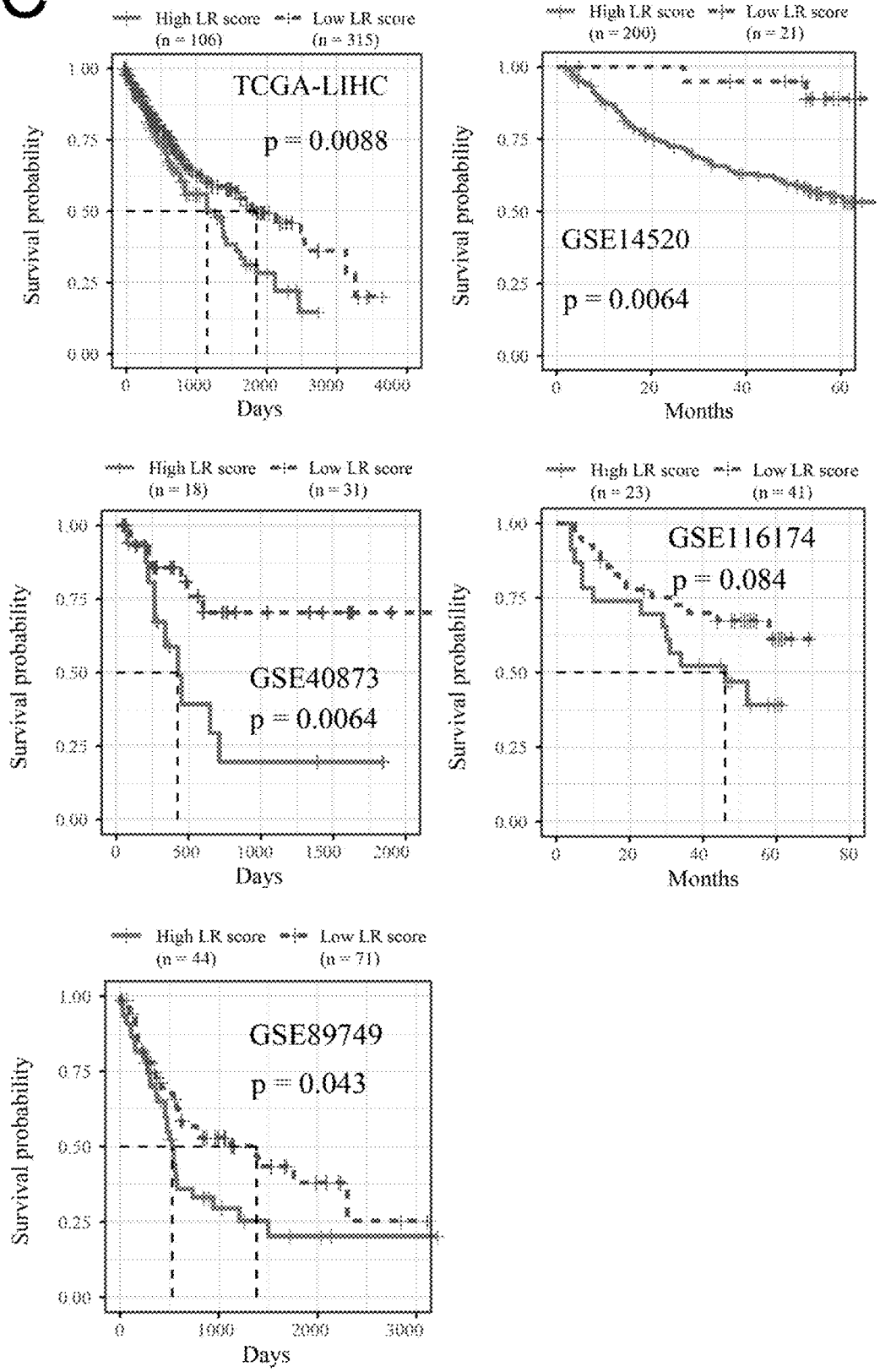
Figure 6D:
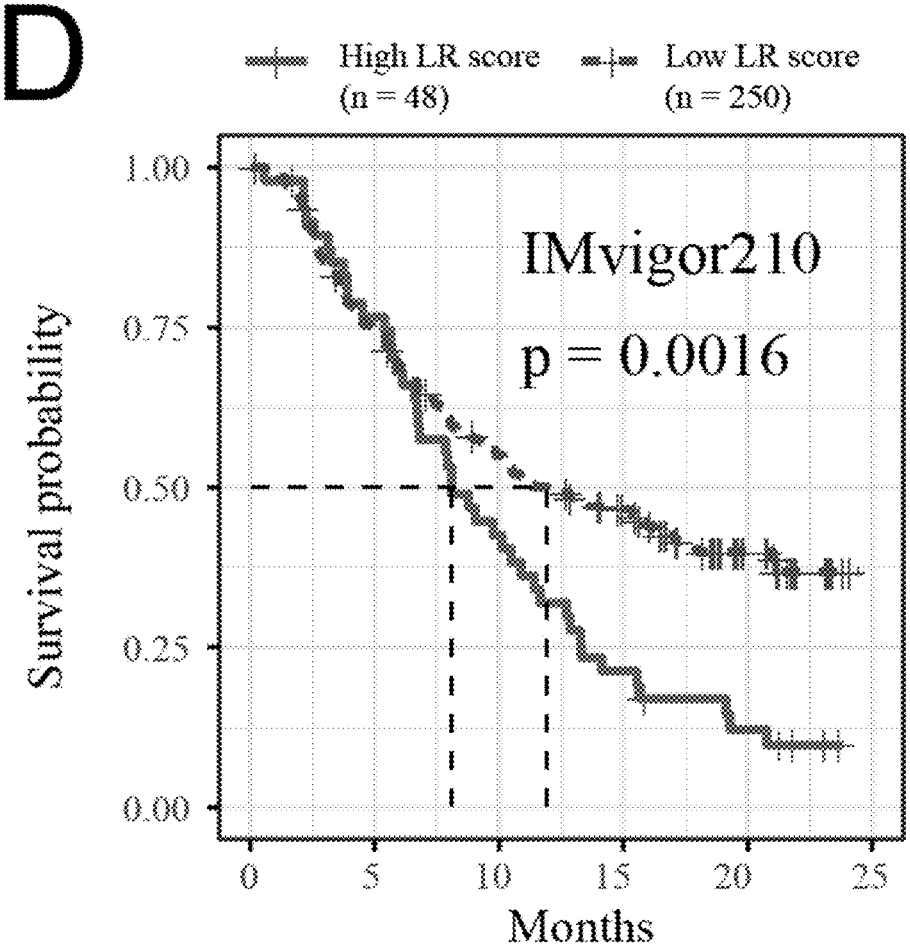
Figure 6E:
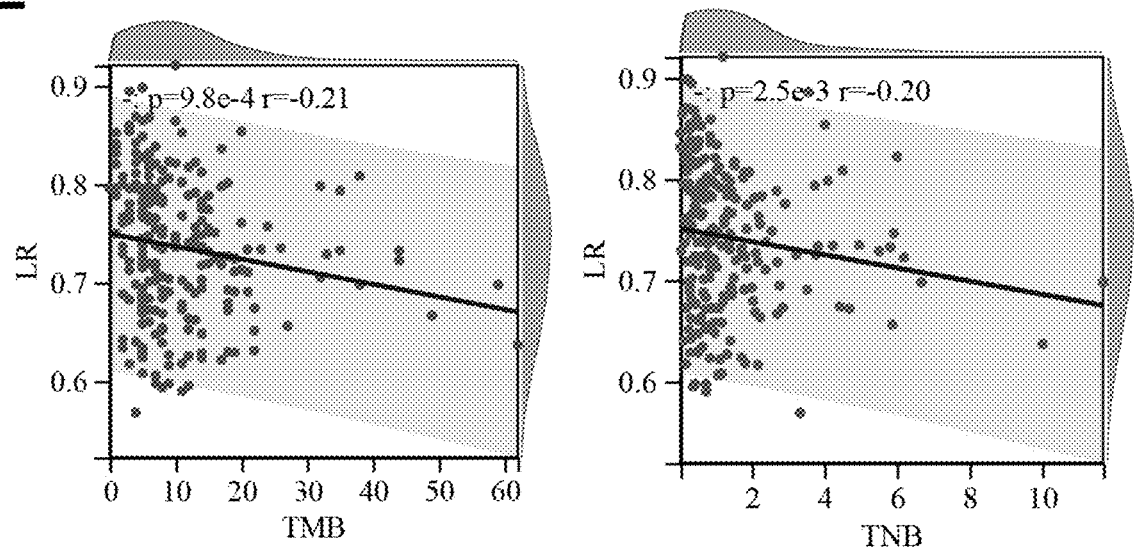
Figure 6F:
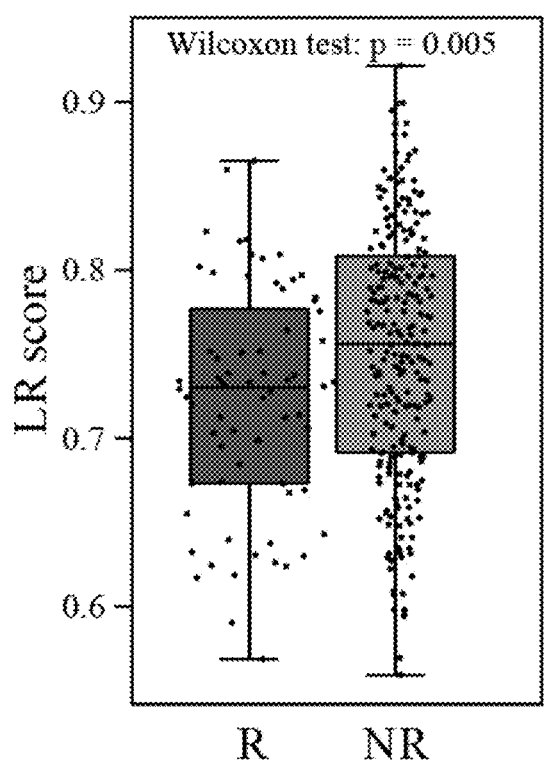
Figure 6G:
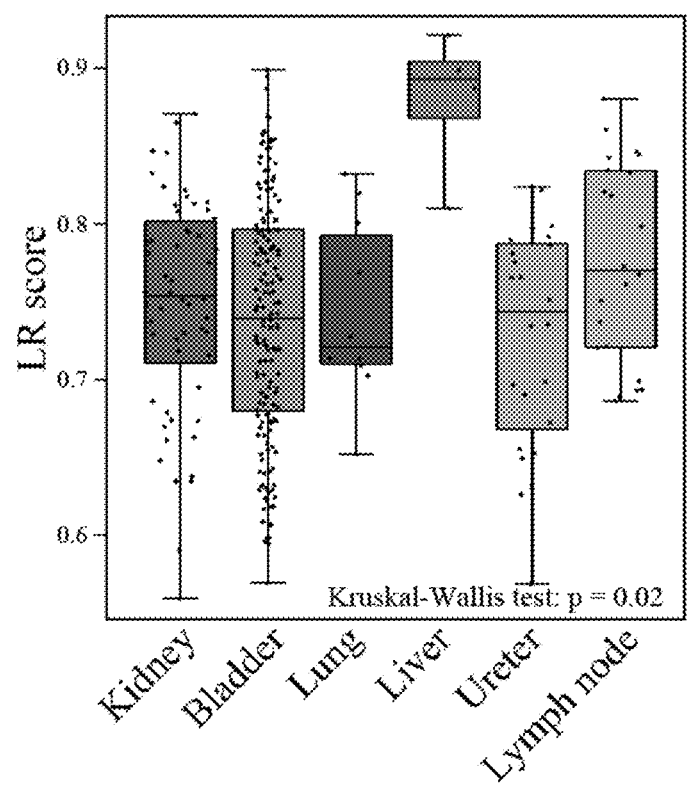

Step 4: analyzing communication between the fibroblasts with high FAP expression and the TAMs, specifically as follows:

identifying the CCC ligand-receptors between TAMs and fibroblasts with high FAP expression using R package NicheNet, and identifying the target genes of fibroblasts with high FAP expression affected by TAMs (FIG. 6A shows the results of NicheNet cell communication analysis on TAMs and fibroblasts with high FAP expression, the first part of the panel shows the Pearson coefficient of macrophage ligands; a high coefficient indicates that the ligand has a high regulatory ability for target genes of fibroblasts, the second part of the panel shows the expression of ligands in different subtypes of macrophages, the third part of the panel shows a comparison of the intensity of ligand expression in HCC and ICC samples, and the fourth part of the panel shows the regulated potential of ligand-targeted regulatory genes). Analyzing the function of target genes by g: Profiler shows that TAMs mainly affect the matrix shaping, collagen fiber formation and angiogenesis functions of fibroblasts with high FAP expression (in FIG. 6B, a bar graph is used to show enrichment pathways and biological terms for target regulatory genes). The ssGSEA algorithm is used to score samples based on the first 30 pairs of ligand-receptor genes with the highest communication activity, and the last 30 pairs are discarded due to their low gene communication activity. The cutoff value for optimal survival grouping of samples is determined by R package survminer, and the correlation between the total score of ligand-receptors and survival probability of patients is assessed using KM curves. In 5 independent hepatoma tissue RNA sequencing cohorts and 1 immunotherapy cohort, a high cellular communication score predicts a poorer overall survival probability of patients (in FIG. 6C and FIG. 6D, FIG. 6C is a KM curve showing the correlation between quantified communication scores and overall survival probabilities of patients in 5 independent tissue transcriptome sequencing cohorts; FIG. 6D is a KM curve showing the correlation between a quantified communication score and an overall survival probability of patients in an immunotherapy tissue transcriptome sequencing cohort). In addition, the cellular communication score is negatively correlated with tumor mutation load and neoantigen load, which are classical evaluation characteristics of immunotherapy efficacy, and patients who fail to respond to immunotherapy have higher cellular communication scores (in FIG. 6E and FIG. 6F, FIG. 6E is a scattered plot showing the correlation between communication scores and tumor mutation load and neoantigen load, and FIG. 6F is a box plot showing that patients in the immunotherapy non-responder group have higher communication scores). At the end, by comparing the scores of different tumor patients who received immunotherapy, it is found that if hepatoma patients have the highest cellular communication scores, it suggests that the communication scores have hepatoma specificity (box plots used in FIG. 6G show that the communication scores are specific in hepatoma samples).

Figure 7A:
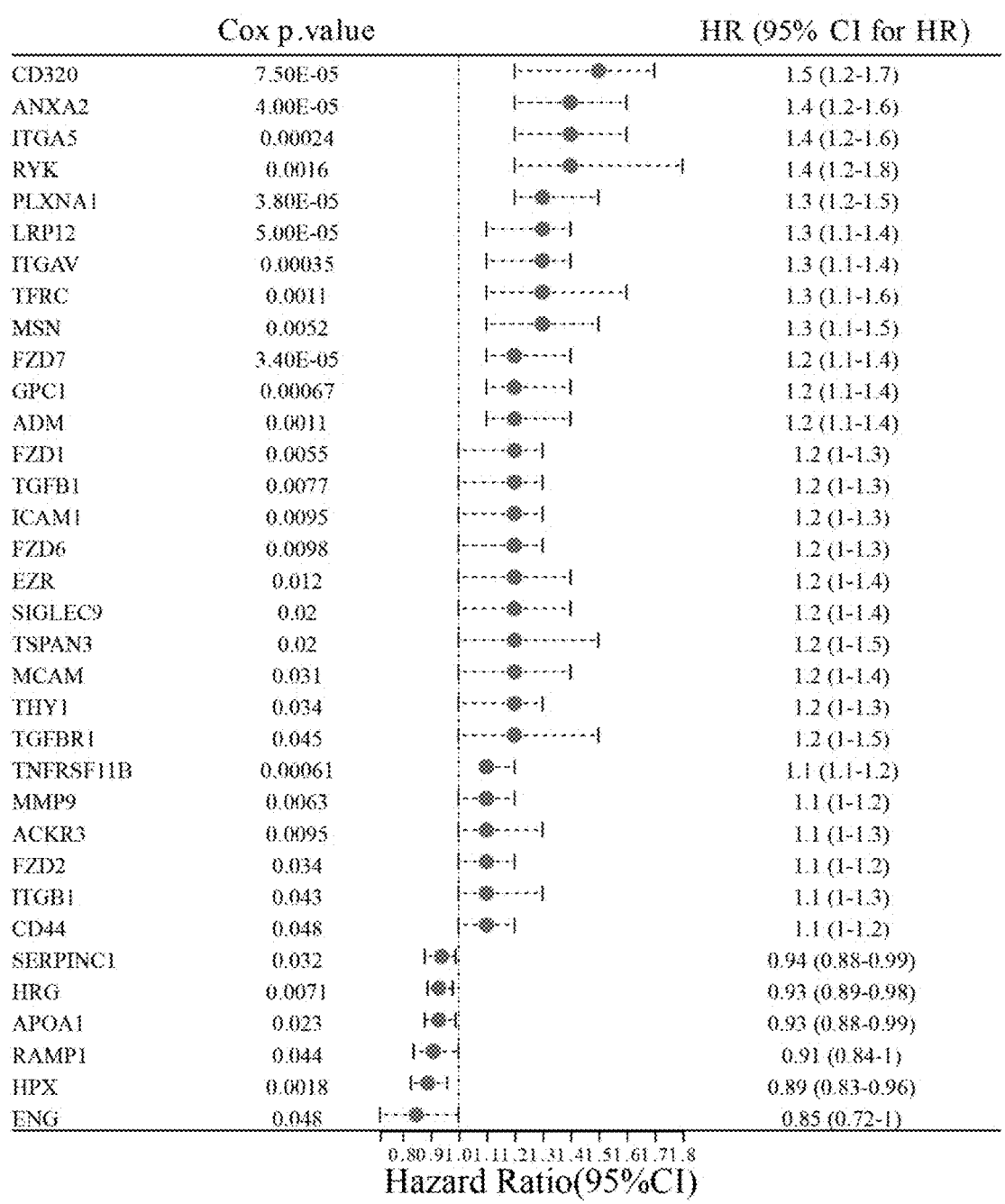
FIG. 7A-FIG. 7E are diagrams of the construction and cohort evaluation of key communicator models used in the present disclosure.
Figure 7B:
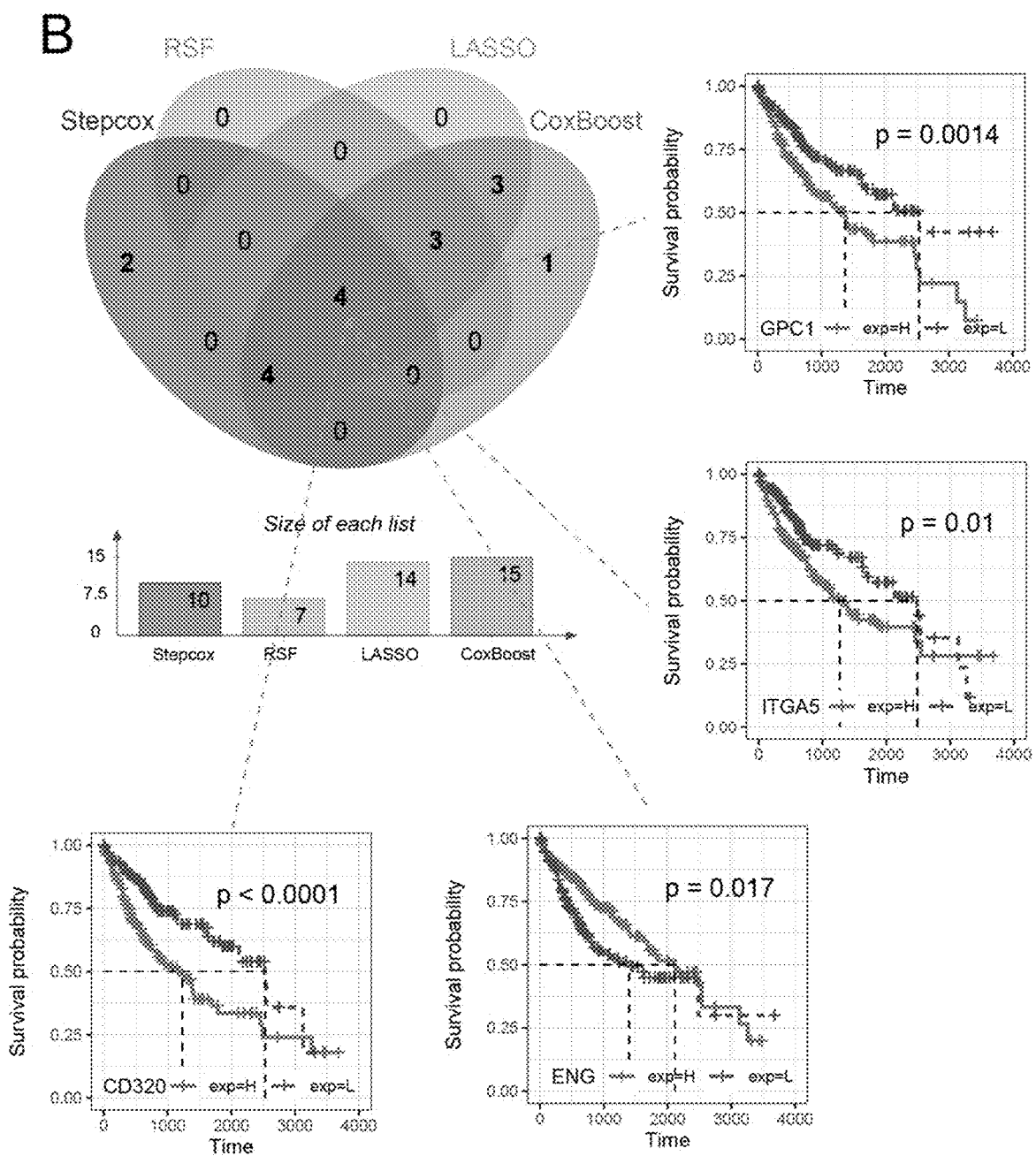

Step 5: screening key CCC ligand-receptor genes based on machine learning, specifically as follows:

first, screening 34 genes that are significantly correlated with the survival probability of patients (Cox $P<0.05$) from the top 30 active ligand-receptor pair genes identified by NitcheNet based on the TCGA HCC cohort using the univariate Cox analysis (FIG. 7A is a forest plot showing ligand-receptor genes correlated with the survival probability of hepatoma patients). In order to further promote the clinical usability of the model, four machine learning algorithms such as Stepcox, RSF, LASSO and CoxBoost are used to screen genes respectively and take intersections to obtain 4 key genes (CD320, GPC1, ITGA5 and ENG) for subsequent modeling (FIG. 7B is a Venn diagram showing the intersections of key genes screened by the 4 machine learning algorithms. KM curve shows the correlation between the expression of these 4 genes and the survival probability of HCC patients).

Step 6: constructing a prognostic model based on ligand-receptor genes and conducting external cohort evaluation, specifically as follows:

Based on the 4 key genes screened, a multivariate Cox model is constructed in the TCGA and GEO hepatoma cohorts. The model scores are calculated as follows:

Cox model score=$\Sigma_i$Expression (mRNA)$_i$*Coefficent (mRNA)$_i$ where i is each key gene screened.

Figure 7C:
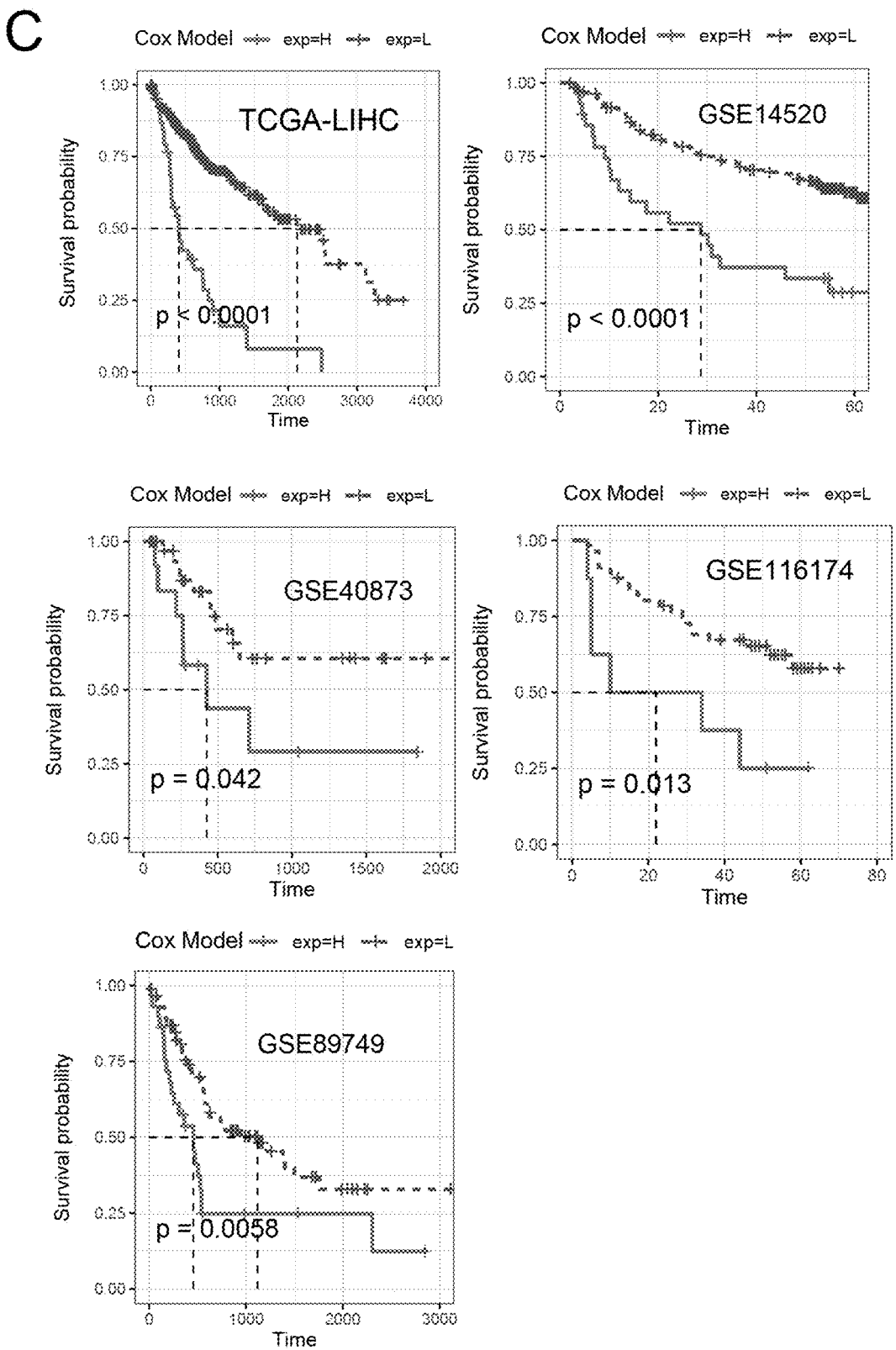
Figure 7D:
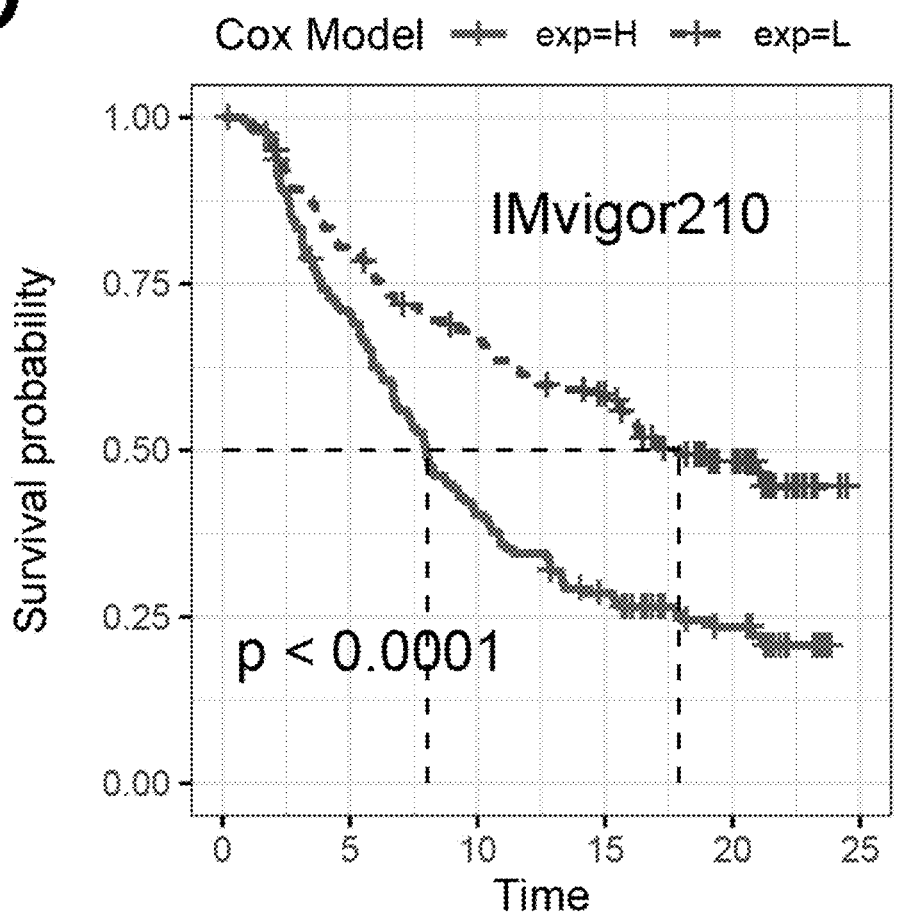
Figure 7E:
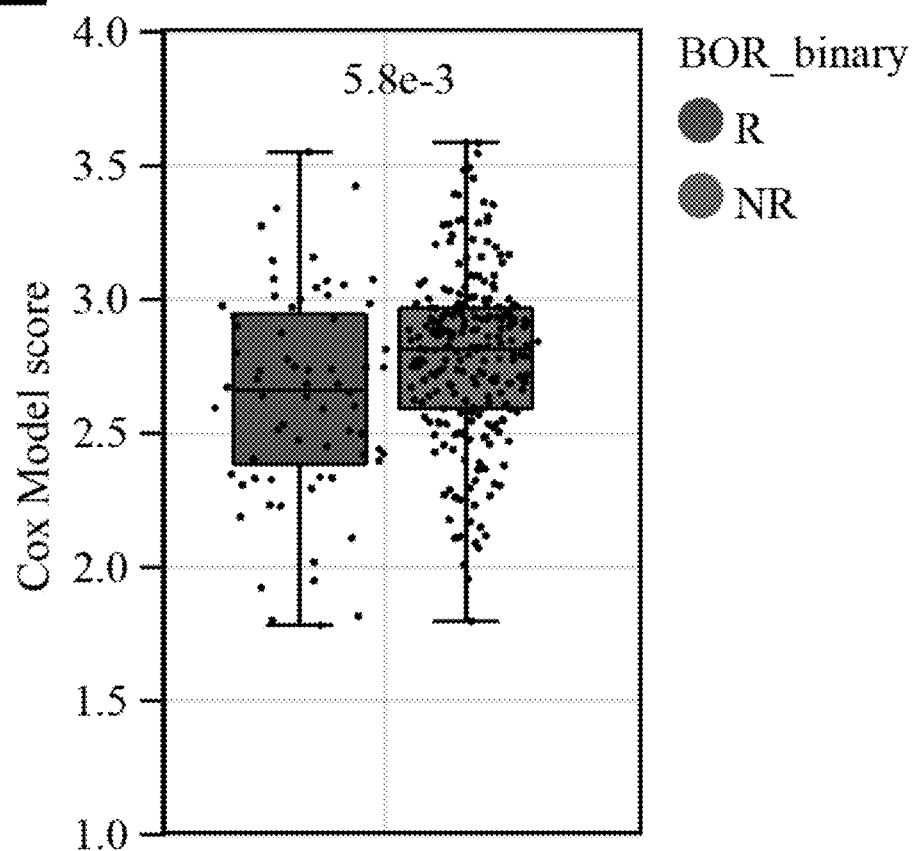

KM curve are used to evaluate the survival prediction performance of the model, which shows a high survival prediction performance in 5 TCGA- and GEO-derived independent hepatoma tissue RNA sequencing cohorts and 1 immunotherapy cohort IMvigor210 (in FIG. 7C and FIG. 7D, FIG. 7C are KM curves showing the survival prediction effect of the constructed model on patients in 5 independent tissue transcriptome sequencing cohorts, FIG. 7D is a KM curve showing the survival prediction effect of the constructed model on patients in immunotherapy tissue transcriptome sequencing cohort). Patient responses to immunotherapy can be assessed based on model scores, with non-responders having higher model scores (FIG. 7E is a box plot showing that patients who fail to respond to immunotherapy have higher model quantified scores). The prognostic prediction result is used to provide patients with a corresponding prognosis auxiliary judgment.

The foregoing are only detailed descriptions of preferred embodiments of the present disclosure, but the protection scope of the present disclosure is not limited thereto. Equivalent substitutions or changes made to technical solutions and inventive concepts according to the present disclosure within the technical scope disclosed by the present disclosure shall be covered by any technicians familiar with the field of the present disclosure.

What is claimed is:

1. A method for constructing a prognostic model of hepatoma, the method comprising the following steps:

(1) obtaining and identifying fibroblasts with high FAP expression, specifically as follows:

(1.1) performing a subgroup classification of hepatoma single-cell data in a collected and integrated discovery cohort using R package seurat to extract fibroblast subgroups with high COL1A1 expression; and (1.2) further subdividing the fibroblast subgroups with high COL1A1 expression obtained in the Step (1.1) to identify fibroblasts with high FAP expression;

(2) obtaining and identifying tumor-associated macrophages (TAMs), specifically as follows;

(2.1) performing a subgroup classification of hepatoma single-cell data in a collected and integrated discovery cohort using R package seurat to extract macrophage subgroups with high CD68 expression;

(2.2) further subdividing the extracted macrophage subgroups with high CD68 expression;

(2.3) performing an OR analysis to assess the enrichment preference of different cell types in different samples and screening for cell types highly enriched in hepatoma samples;

(2.4) reconstructing a macrophage differentiation process using an RNA rate analysis in another collected and integrated single-cell validation cohort, and identifying the type of macrophages that terminally differentiate with tumor development as TAMs; the macrophage type being high Disabled-2 (DAB2) expression or high Secreted Phosphoprotein 1 (SPP1) expression; and (3) co-localizing the fibroblasts with high FAP expression obtained in the Step (1) and the TAMs obtained in the Step (2);

(4) communicating and analysing the fibroblasts with high FAP expression after the localization in the Step (3) with TAMs to obtain CCC ligand-receptor genes, specifically as follows;

(4.1) identifying the CCC ligand-receptors between TAMs and fibroblasts with high FAP expression using R package NicheNet, and identifying the target genes of fibroblasts with high FAP expression affected by TAMs;

(4.2) analysing, the function of target genes by g: Profiler to understand the main functional regulation of TAMs on fibroblasts with high FAP expression;

(4.3) scoring a tissue sequencing sample based on the activity of CCC ligand-receptors using the ssGSEA algorithm, and the scoring result being LRscore;

(4.4) identifying a cutoff value of optimal survival probability grouping of samples by R package survminer, and testing the predictive effect of LRscore on an overall survival probability of patients by Kaplan-Meier curves, wherein if log-rank p<0.05, the test standards are satisfied;

(4.5) on the basis of the Step (4.4), testing the predictive effect of LRscore on immunotherapy response in patients with hepatoma by box plots, wherein if wilcox.testp<0.05, the test standards are satisfied; and (4.6) obtaining CCC ligand-receptor genes based on the result of the Step (4.5);

(5) screening the CCC ligand-receptor genes obtained in the Step (4) based on machine learning to obtain key CCC ligand-receptor genes, the key CCC ligand-receptor genes are CD320, GPC1, ITGA5 and ENG; and;

(6) constructing a prognostic model of hepatoma according to the key CCC ligand-receptor genes obtained in the Step (5);

(6.1) based on the modeling genes determined in the Step (5), constructing a multivariate Cox model in the TCGA and GEO hepatoma cohorts, calculating model scores, and the model score being calculated according to the following equation:

Coxmodel score=$\Sigma_i$Expression (mRNA)$_i$*Coefficent (mRNA)$_i$ where i is the key gene screened;

(6.2) using KM curves to evaluate the survival prediction performance of the model constructed in the Step (6.1);

(6.3) predicting patients' response to immunotherapy based on Coxmodel score, wherein non-responders exhibit higher Coxmodel scores than responders, and patients are classified into a non-responder group and a responder group according to the Coxmodel scores, and the method further comprises:

administering a first treatment regimen comprising an immunotherapy to a patient classified into the responder group.

2. The method according to claim 1, wherein the specific implementation manner of the Step (3) is as follows: mapping the identified single-cell subgroup to spatial transcriptome sequencing sections using R package CellTrek, and confirming that fibroblasts with high FAP expression have a high spatial proximity to TAMs by Kullback-Leibler divergence.

3. The method according to claim 2, wherein the specific implementation manner of the Step (5) is as follows:

(5.1) in the TCGA HCC cohort, genes with log-rank p<0.05 being further screened from those constructed for LRscoring using univariate Cox analysis; and (5.2) using such machine learning algorithms as Stepcox, RSF, LASSO and CoxBoost to determine key genes from the genes screened in the Step (5.1), respectively, and defining an intersection of key genes to obtain final modeling genes.

4. A prognostic model of hepatoma obtained by the method according to claim 1.

5. An application of the prognostic model of hepatoma according to claim 4 in auxiliary judgment of disease prognosis.

6. An application of the prognostic model of hepatoma according to claim 4 in auxiliary judgment of hepatoma prognosis.

\* \* \* \* \*